US010097557B2

(12) United States Patent
Armer

(10) Patent No.: US 10,097,557 B2
(45) Date of Patent: Oct. 9, 2018

(54) VIRTUAL COLLABORATION SYSTEMS AND METHODS

(71) Applicant: Lam Research Corporation, Fremont, CA (US)

(72) Inventor: Michael Armer, Tracy, CA (US)

(73) Assignee: LAM RESEARCH CORPORATION, Fremont, CA (US)

( * ) Notice: Subject to any disclaimer, the term of this patent is extended or adjusted under 35 U.S.C. 154(b) by 179 days.

(21) Appl. No.: 15/007,391

(22) Filed: Jan. 27, 2016

(65) Prior Publication Data

US 2017/0099297 A1 Apr. 6, 2017

Related U.S. Application Data

(60) Provisional application No. 62/235,846, filed on Oct. 1, 2015.

(51) Int. Cl.

| G06F 21/62 | (2013.01) |
|---|---|
| H04L 29/06 | (2006.01) |
| H04L 29/08 | (2006.01) |
| H04L 12/58 | (2006.01) |

(52) U.S. Cl.
CPC ............ *H04L 63/105* (2013.01); *H04L 51/22* (2013.01); *H04L 51/24* (2013.01); *H04L 63/08* (2013.01); *H04L 67/02* (2013.01); *H04L 67/10* (2013.01); *H04L 67/30* (2013.01)

(58) Field of Classification Search
CPC ....... H04L 63/105; H04L 51/22; H04L 51/24; H04L 63/08; H04L 67/02; H04L 67/10; H04L 67/30
See application file for complete search history.

(56) References Cited

U.S. PATENT DOCUMENTS

| 7,734,927 | B2 * | 6/2010 | Stewart | G06Q 10/10 713/150 |
|---|---|---|---|---|
| 8,051,491 | B1 * | 11/2011 | Cavage | G06F 21/6218 707/609 |
| 8,108,672 | B1 * | 1/2012 | Herbach | G06F 21/6218 705/51 |
| 8,627,077 | B2 * | 1/2014 | Herbach | G06F 21/6218 713/168 |
| 8,806,595 | B2 * | 8/2014 | Nimashakavi | G06F 21/335 726/6 |

(Continued)

*Primary Examiner* — Sharon S Lynch

(57) ABSTRACT

A system including a domain controller and a document, policy, and collaboration servers. The document server receives a request signal based on an input received at a web browser of a user device and generates an authentication signal. The request signal requests access to a document. The document server provides a cloud-based service for access to the document. The domain controller, based on the authentication signal, determines a profile or authorization level of a user. The document server, based on the profile or the authorization level, transmits a second authentication signal to the user device. The policy server stores a digital rights management policy for the user. The collaboration server: based on the second authentication signal, receives a digital rights management signal from the user device; and based on the digital rights management policy of the user, permits a controller of the user device to access the document.

26 Claims, 12 Drawing Sheets

(56) References Cited

U.S. PATENT DOCUMENTS

| | | | | |
|---|---|---|---|---|
| 8,904,181 B1* | 12/2014 | Felsher | H04L 9/0825 | 380/282 |
| 9,171,333 B2* | 10/2015 | Beresford-Wood | G06Q 40/12 | |
| 9,280,773 B1* | 3/2016 | Evans | G06Q 20/4014 | |
| 9,613,190 B2* | 4/2017 | Ford | G06F 21/10 | |
| 9,762,553 B2* | 9/2017 | Ford | H04L 63/0428 | |
| 2002/0184535 A1* | 12/2002 | Moaven | G06F 21/6218 | 726/17 |
| 2002/0188841 A1* | 12/2002 | Jones | G06F 17/30876 | 713/153 |
| 2004/0019807 A1* | 1/2004 | Freund | H04L 63/0227 | 726/1 |
| 2004/0024477 A1* | 2/2004 | Deitz | G06F 21/40 | 700/86 |
| 2004/0024714 A1* | 2/2004 | Wells | G06F 21/6218 | 705/78 |
| 2004/0128506 A1* | 7/2004 | Blakley, III | H04L 63/0815 | 713/170 |
| 2004/0243260 A1* | 12/2004 | Law | G06Q 10/10 | 700/86 |
| 2005/0114650 A1* | 5/2005 | Rockwood | H04L 63/08 | 713/155 |
| 2005/0114674 A1* | 5/2005 | Carley | G06F 21/40 | 713/182 |
| 2006/0080316 A1* | 4/2006 | Gilmore | G06F 17/30864 | |
| 2006/0129809 A1* | 6/2006 | Battagin | G06F 21/6209 | 713/166 |
| 2007/0038765 A1* | 2/2007 | Dunn | G06F 21/6218 | 709/229 |
| 2007/0162417 A1* | 7/2007 | Cozianu | G06F 17/30011 | |
| 2007/0220068 A1* | 9/2007 | Thompson | G06F 21/6218 | |
| 2007/0239998 A1* | 10/2007 | Beck | G06F 19/322 | 713/193 |
| 2007/0240203 A1* | 10/2007 | Beck | G06F 19/322 | 726/4 |
| 2007/0256133 A1* | 11/2007 | Garbow | H04L 63/0263 | 726/26 |
| 2008/0320560 A1* | 12/2008 | Casey | H04L 63/10 | 726/3 |
| 2009/0112868 A1* | 4/2009 | Rajamani | G06F 17/30867 | |
| 2009/0150968 A1* | 6/2009 | Ozzie | H04L 63/08 | 726/1 |
| 2010/0313246 A1* | 12/2010 | Irvine | H04L 63/102 | 726/4 |
| 2011/0004943 A1* | 1/2011 | Chaganti | H04L 29/06 | 726/30 |
| 2011/0023097 A1* | 1/2011 | McDiarmid | H04L 63/08 | 726/5 |
| 2011/0197159 A1* | 8/2011 | Chaganti | H04L 29/06 | 715/781 |
| 2012/0110174 A1* | 5/2012 | Wootton | G06F 21/564 | 709/224 |
| 2012/0204221 A1* | 8/2012 | Monjas Llorente | G06F 21/335 | 726/1 |
| 2012/0284516 A1* | 11/2012 | Errico | G06F 21/32 | 713/168 |
| 2013/0036455 A1* | 2/2013 | Bodi | H04L 63/0807 | 726/4 |
| 2013/0198807 A1* | 8/2013 | Herbach | G06F 21/6218 | 726/4 |
| 2013/0212250 A1* | 8/2013 | Kleppner | G06Q 10/10 | 709/224 |
| 2013/0218829 A1* | 8/2013 | Martinez | G06F 21/6272 | 707/608 |
| 2013/0254699 A1* | 9/2013 | Bashir | G06F 3/0481 | 715/772 |
| 2013/0318347 A1* | 11/2013 | Moffat | H04L 63/08 | 713/168 |
| 2014/0012614 A1* | 1/2014 | Beresford-Wood | G06Q 40/12 | 705/7.15 |
| 2014/0189808 A1* | 7/2014 | Mahaffey | H04L 63/083 | 726/4 |
| 2014/0189818 A1* | 7/2014 | Meyer | G06F 21/62 | 726/4 |
| 2014/0245015 A1* | 8/2014 | Velamoor | H04L 63/061 | 713/171 |
| 2014/0298207 A1* | 10/2014 | Ittah | G06Q 10/00 | 715/753 |
| 2014/0304836 A1* | 10/2014 | Velamoor | G06F 21/6209 | 726/28 |
| 2015/0067893 A1* | 3/2015 | Lee | G06F 21/10 | 726/30 |
| 2015/0135300 A1* | 5/2015 | Ford | H04L 67/1097 | 726/11 |
| 2015/0163206 A1* | 6/2015 | McCarthy | G06F 21/6227 | 713/171 |
| 2016/0026965 A1* | 1/2016 | Beresford-Wood | G06Q 40/12 | 705/7.15 |
| 2017/0093870 A1* | 3/2017 | Meyer | H04L 63/10 | |
| 2017/0142076 A1* | 5/2017 | Ford | H04L 63/0428 | |
| 2017/0199988 A1* | 7/2017 | Knox | G06F 21/10 | |
| 2017/0201518 A1* | 7/2017 | Holmqvist | H04L 63/0884 | |

* cited by examiner

VIRTUAL COLLABORATION SYSTEMS AND METHODS

CROSS-REFERENCE TO RELATED APPLICATIONS

This application claims the benefit of U.S. Provisional Application No. 62/235,846, filed on Oct. 1, 2015. The entire disclosures of the applications referenced above are incorporated herein by reference.

FIELD

The present disclosure relates to document sharing systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

There is a need for employees of a corporation, customers and suppliers to electronically share highly sensitive documents (e.g., agreements, documents pertaining to intellectual property, etc.). Current options for sharing such data are limited to an extranet, email, white rooms, online file sharing services, and/or physical delivery of data. An extranet refers to a network located at the corporation, which allows customers and/or suppliers to remotely access documents. An extranet places an owner of the extranet (e.g., the corporation) in a privileged position. The extranet owner has control of the data and documents stored in the extranet, as well as control of accessibility, traceability, and auditability of the documents. This can place the customers and/or suppliers at a disadvantage.

Sending sensitive data via email can be fraught with risk since email has limited security with regard to data protection. In addition, the amount of data and files that can be included in an email is also limited. Process automation also cannot be handled via email. A "white room" refers to a cloud based service in which documents can be stored in a third party server and accessed by multiple parties. Typically, a white room owner (e.g., a corporation) that had the white room setup is placed in a privileged position over the counterpart (e.g., customer or supplier) with regard to control of the system storing the privileged data and the data stored in the system. The white room owner also controls access to the data. Purchase of a white room can be expensive. Online file sharing services (e.g., Dropbox®) typically have limited security. Although data can be transferred physically by, for example, mailing flash drives, solid-state drives, memory cards, etc. via a courier/parcel service, this form of data transfer is inefficient and has minimal security.

SUMMARY

A system is provided and includes a document server, a domain controller, a policy server, and a collaboration server. The document server is configured to (i) receive a first request signal based on an input received at a web browser of a first user device, and (ii) generate a first authentication signal. The first request signal requests access to a first document. The document server provides a cloud-based service for access to the first document. The domain controller is configured to, based on the first authentication signal, determine a profile or authorization level of a first user of the first user device. The document server is configured to, based on the profile or the authorization level, transmit a second authentication signal to the first user device. The policy server is configured to store a digital rights management policy for the first user. The collaboration server is configured to (i) based on the second authentication signal, receive a digital rights management signal from the first user device, and (ii) based on the digital rights management policy of the first user, permit a controller of the first user device to access the first document. The collaboration server is separate from the document server, and the domain controller.

In other features, a method is provided and includes: receiving a first request signal at a document server based on an input received at a web browser of a first user device; generating a first authentication signal, where the first request signal requests access to a first document, and where the document server provides a cloud-based service for access to the first document; and based on the first authentication signal, determining a profile or authorization level of a first user of the first user device. The document server is configured to, based on the profile or the authorization level, transmit a second authentication signal to the first user device. The method further includes: storing a digital rights management policy for the first user at a policy server; based on the second authentication signal, receiving at a collaboration server a digital rights management signal from the first user device; and based on the digital rights management policy of the first user, permitting a controller of the first user device to access the first document, wherein the collaboration server is separate from the document server.

In yet other features, a first network device is provided and includes a display, a controller, and a transceiver. The display is configured to display a window of a web browser. The controller is configured to (i) via the window, access a virtual collaboration center system, and (ii) generate a first request signal requesting access to a document. The transceiver is configured to (i) transmit the first request signal to a document server in the virtual collaboration center system, and (ii) based on the first request signal, receive an email notification from a mail server, where the email notification indicates whether access to the document is permitted. The controller is configured to perform a digital rights management verification including generating a second request signal. The transceiver is configured to (i) transmit the second request signal to a collaboration server, and (ii) based on the second request signal, receive a response signal from the collaboration server. The controller is configured to, based on the response signal, access the document.

In other features, a method of operating a first network device is provided. The method includes: displaying a window of a web browser; via the window, accessing a virtual collaboration center system; generating a first request signal requesting access to a document; transmitting the first request signal to a document server in the virtual collaboration center system; based on the first request signal, receiving an email notification from a mail server, where the email notification indicates whether access to the document is permitted; performing a digital rights management verification including generating a second request signal; transmitting the second request signal to a collaboration server; based on the second request signal, receiving a response signal from the collaboration server; and based on the response signal, accessing the document.

In other features, a system is provided and includes physical servers and a configurator controller. The physical servers implement virtual collaboration center instances, where each of the virtual collaboration instances has a respective set of virtual servers, such that one or more of the physical servers are implementing two or more of the virtual servers. The configurator controller is implemented on one of the physical servers and is configured to create the virtual collaboration center instances, where during creation of each of the virtual collaboration center instances. The configurator controller is configured to: receive a signal from a first user device of an initiator indicating whether a counterpart to an administrator is involved; instruct a mail server to send a first set of one or more emails to the administrator or the counterpart, where the physical servers includes the mail server; based on the first set of one or more emails, receive configuration information of the corresponding virtual collaboration center instance (i) from the first user device or a third user device of the administrator, or (ii) from a second user device of the counterpart; create the corresponding virtual collaboration center instance and administrator accounts; and send a second set of one or more emails to the administrator or counterpart with links to the corresponding virtual collaboration center instance.

In other features, a method of operating physical servers is provided. The physical servers implement virtual collaboration center instances. Each of the virtual collaboration instances has a respective set of virtual servers, such that one or more of the physical servers are implementing two or more of the virtual servers. The method includes creating the virtual collaboration center instances via a configurator controller implemented on one of the physical servers. Creation of each of the virtual collaboration center instances includes: receiving a signal from a first user device of an initiator indicating whether a counterpart to an administrator is involved; instructing a mail server to send a first set of one or more emails to the administrator or the counterpart, where the physical servers includes the mail server; based on the first set of one or more emails, receiving configuration information of the corresponding virtual collaboration center instance (i) from the first user device or a third user device of the administrator, or (ii) from a second user device of the counterpart; and creating the corresponding virtual collaboration center instance and administrator accounts. The method further includes sending a second set of one or more emails to the administrator or counterpart with links to the corresponding virtual collaboration center instance.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
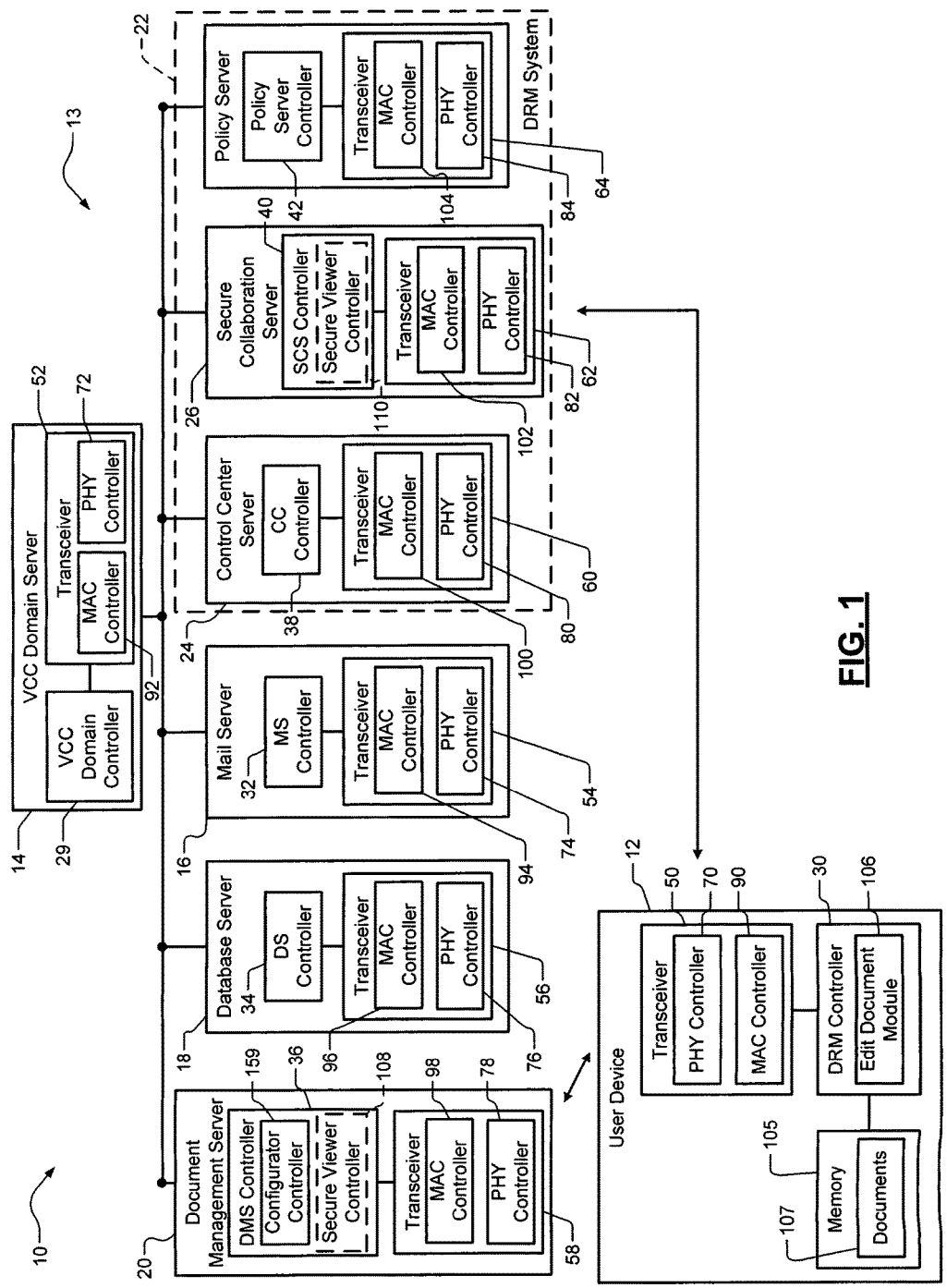
FIG. 1 is a functional block diagram of a virtual collaboration center (VCC) system in accordance with the present disclosure.

Traditional options for sharing data including extranet, email, white rooms, online file sharing services, and physical delivery of data are limited. These options have limited security and lack the ability for process automation in the form of workflows, digital rights management, user management tools, and collaboration tools. Although online file sharing services allow for the sharing of files and provide basic security through user authentication and exchange of credentials, the online file sharing services lack robust user management, digital rights management, workflows, and collaboration tools.

The following disclosure provides examples of a virtual collaboration center (VCC) system, which provides improved security, allows for process automation, and provides robust user management, digital rights management, workflows, and collaboration tools. The user management tools have a dedicated domain controller for user authentication and profile determination. The collaboration tools may include and/or provide a dedicated email server, discussion boards, dashboards, chat applications, user task lists and files, calendars, and/or wikis. A wiki refers to a website that allows collaborative modification of content directly from a web browser.

The VCC system has many advantages over the traditional options for sharing data. The VCC system places a corporation, customers, and suppliers on an equal footing in the configuration and management of a data sharing system, files stored in the data sharing system, and users of the data sharing system. The VCC system also provides a controlled and mutually-configured technique for securely sharing and fully maintaining control of documents once shared. This is unlike company email, white rooms, physical delivery, and/or traditional file sharing services. The VCC system provides a method to positively maintain control of a file once the file has been removed from the VCC system. The traditional options of data sharing do not provide this level of security.

The following features are also not provided by the traditional options of data sharing. The VCC system encrypts files and documents in each stage of the lifecycles of the files and documents. This improves security and renders hacked or leaked files/documents useless. Each of the parties (or users) accessing the VCC system can remove access permissions and disable documents that are outside the VCC system and downloaded to local computers. The VCC system is configured to receive business intelligence data from other systems separate from the VCC system and render visualizations (dashboards) of that data. The VCC system manages access to data at the user level and applies watermarks to each document and/or dashboard displayed. The VCC system also has social and collaboration tools such as project-specific instant messaging, calendars, forums, wikis, task lists, and workflows not found in the traditional options of data sharing. The VCC system provides logging and anytime access to logs by the parties, which improves traceability and transparency over sharing files by email, through white rooms, by physical sharing, or with online file sharing services.

FIG. 1 shows a VCC system 10, such as that referred to above, which includes a user device 12 and a VCC network (sometimes referred to as a VCC cloud) 13. The VCC network 13 includes a VCC domain server 14, a mail server 16, a database server 18, a document management server (DMS) 20, and a DRM system 22. The user device 12 may be a computer, a tablet, a mobile phone, a wearable device, or other network device. The user device 12 may directly communicate with servers and/or devices in the VCC network 13 or may communicate indirectly with the servers and devices via a wireless and/or wire based network. As an example, the user device 12 may communicate with the servers and devices in the VCC network 13 via an Internet. The DRM system 22 includes one or more servers. As shown, the DRM system 22 includes a control center server 24, a secure collaboration server 26, and a policy server 28.

The user device 12, and the servers 14, 16, 18, 20, 24, 26, 28 include respectively a VCC domain controller 29, a digital rights management (DRM) controller 30, a mail server (MS) controller 32, a database server (DS) controller 34, a DMS controller 36, a control center (CC) server 38, a secure collaboration server (SCS) controller 40, and a policy server (PS) controller 42. Although the servers 14, 16, 18, 20, 24, 26, 28 are shown as separate servers, two or more of the servers 14, 16, 18, 20, 24, 26, 28 may be implemented as a single server. In one implementation, the user devices are at a company, suppliers of the company, customers of the company, and/or other cloud-based service receiving entity, whereas one or more of the servers 14, 16, 18, 20, 24, 26, 28 are implemented by a cloud-based service provider. One or more of the servers 14, 16, 18, 20, 24, 26, 28 may be implemented at one or more of the cloud-based service receiving entities.

The user device 12 and servers 14, 16, 18, 20, 24, 26, 28 also include respective transceivers 50, 52, 54, 56, 58, 60, 62, 64. The transceivers 50, 52, 54, 56, 58, 60, 62, 64 may wirelessly communicate with each other or via wires. As shown, the transceiver 50 wirelessly communicates with the transceivers 58 and 62 and the transceivers 52, 54, 56, 58, 60, 62, 64 communicate via a network 69. The transceivers 50, 52, 54, 56, 58, 60, 62, 64 have respective media access control (MAC) controllers 70, 72, 74, 76, 78, 80, 82, 84 and respective physical (PHY) controllers 90, 92, 94, 96, 98, 100, 102, 104. Communication and transfer of signals as described herein may be performed via the stated transceivers 50, 52, 54, 56, 58, 60, 62, 64, MAC controllers 70, 72, 74, 76, 78, 80, 82, 84, and PHY controllers 90, 92, 94, 96, 98, 100, 102, 104.

The user device 12 may include a memory 105 for storing documents 107 and/or other information. The other information may include, for example, DRM policy information. The DRM policy information may be associated with one or more users and/or user devices.

The DRM controller 30 may be referred to as a rights management client device and executes DRM and/or editing software, which may be implemented in a form of an application and used for interfacing with the VCC system 10. The DRM and/or editing software may be downloaded to the user device 12 when the user device 12 initially accesses the VCC system 10 and/or is provided with an invite to access the VCC system 10. The DRM controller 30 may include an edit document module 106. The edit document module 106 may control whether a user of the user device 12 is able to edit a document. The DRM controller 30 may perform DRM verifications as described below and exchange information with the secure collaboration server via a secure protocol (e.g., a secure hypertext transfer protocol (HTTP)).

The DMS controller 36 may include a secure viewer controller 108. The SCS controller 40 may include a secure viewer controller 110. The secure viewer controllers 108, 110 may operate similarly. In one implementation, only one of the secure viewer controllers 108, 110 are included in the VCC system 10. The secure viewer controllers 108, 110 control whether the user of the user device 12 is able to view a document via, for example, a display of the user device 12.

Documents stored in the VCC system 10 and/or provided from VCC system 10 may have a common extension, such as .nxl. A downloaded Word file, for example, may have a .docx.nxl extension. Documents may be viewed, uploaded, downloaded and/or edited via a web browser window and/or via an application running on the user device 12. When viewed via the web browser window, other users may also view the document on other user devices, for example during a chat session. The web browser may display a list of shared documents and/or files ("documents/files") accessible to a user. The user then clicks on a name of one of the documents/files and the document/file is opened in the appropriate native application for that document/file. For example, if a document is a Word® document, Word® is initiated and the document is opened via the Word® application. The user may also access documents/files by viewing a list of documents/files and/or corresponding links downloaded to the user device.

Operation of the user device 12 and the servers 14, 16, 18, 20, 24, 26, 28 is further described below with respect to the embodiments of FIGS. 2-11.

Figure 2:
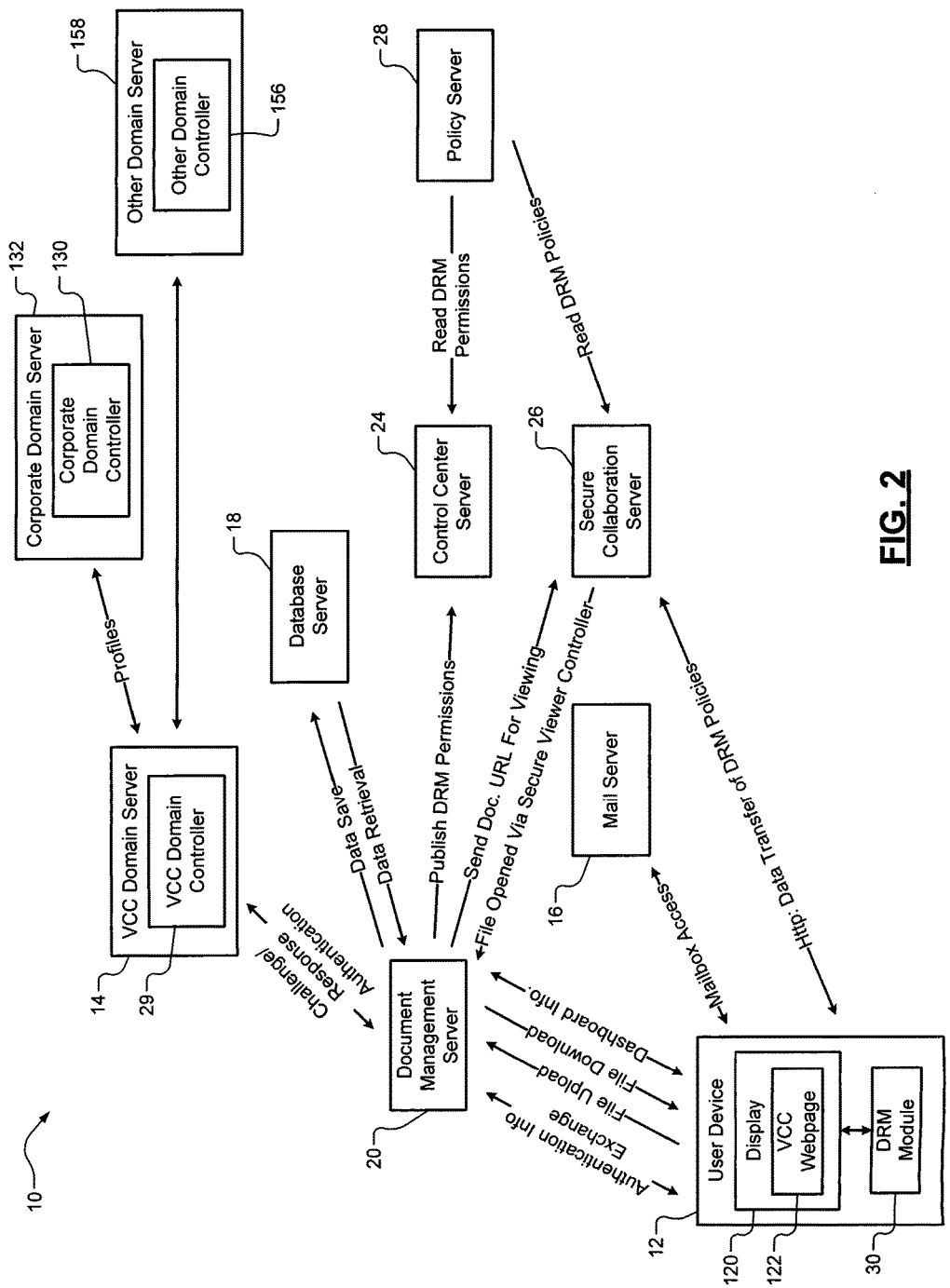
FIG. 2 is a functional block diagram of the VCC system illustrating data flow in accordance with the present disclosure.

Referring now also to FIG. 2, which shows the VCC system 10 and illustrates data flow. The VCC system 10 includes the user device 12 and the servers 14, 16, 18, 20, 24, 26, 28. The user device 12 may include the DRM module 30 and a display 120, which may display VCC webpages (one VCC webpage 122 is shown). The VCC domain server 14 may include the VCC domain controller 29. The VCC domain controller 29 may communicate with other domain controllers of other VCC and/or non-VCC domains.

A domain refers to one or more user devices and corresponding servers that have access to one or more documents, files, profiles, and/or other information. Examples of domains are corporation domains, supplier domains, customer domains, and institutional domains, which store information accessible to corresponding employees, managers, administrators, students, attorneys. Another type of domain is a VCC domain, which refers to one or more user devices, one or more physical servers, and one or more virtual servers that collectively operate as a VCC system and have access to one or more documents and/or one or more files. A physical server may operate as multiple virtual severs, where each virtual server is associated with a VCC domain and a VCC instance. A physical server may be associated with one or more VCC domains and one or more VCC instances. Each VCC domain may one or more VCC instances. Each VCC instance refers to a set of virtual servers, which are provided my one or more physical servers. In one embodiment, each VCC instance includes multiple virtual servers provided by multiple physical servers. Each VCC domain may have a group of documents and/or files. A group of documents and/or files may include sets of documents and/or files, where each of the sets corresponds with a respective VCC instance.

A VCC instance includes one or more user devices and one or more virtual servers, which are active in providing, authorizing, verifying, monitoring, preventing, and/or receiving access to one or more documents. The term "access" as used herein refers to viewing, displaying, downloading, editing, decrypting, and/or sharing of one or more documents. Each VCC instance is created and may have a project term. At the end of the project term, the VCC instance may be deconstructed and the corresponding documents associated with the VCC instance may be archived or deleted. Creation and deconstruction of VCC instances may be implemented by the DMS 20 as is further described below with respect to FIG. 12.

The data flow and signals shown in FIG. 2 illustrate some scenarios implemented by the VCC system 10. A first example scenario is referred to as "account creation" and includes creation of a VCC account for a VCC domain. A document or file owner, a project manager, and/or an administrator may select a user device and/or an employee or other individual for which an account is to be created. A document or file may be owned by an individual or may be jointly owned by multiple individuals, in which case permitted access may be needed from both individuals. A DRM application may be downloaded to the user device and executed, such that a controller of the user device operates as a DRM controller (e.g., the DRM controller 30). A corporate domain controller 130 of a corporate domain server 132 may transfer a profile to the VCC domain controller 29 for the user device, employee and/or other individual. The profile may include information pertaining to the user, such as a name of the user, unique identifiers of one or more devices (e.g., the user device 12) of the user, an email address of the user, an authorization level, and a permission set. The user may be: an employee of a company, supplier or customer; a project manager of the company, supplier, or customer; an administrator of the company, supplier or customer; and/or other user. Other users may be, for example, employees or students of a university, an attorney, a legal administrator, and/or an employee of a subsidiary.

The authorization level may be one of predetermined authorization levels. As an example, the authorization level may be 1 of 5 authorization levels. Level 1 may be associated with a least amount of security. Level 5 may associated with a maximum amount of security. Table 1 shows examples of the 5 authorization levels and corresponding security descriptions for various actions that may be performed by a user device.

TABLE 1

Sample Authorization Levels

| Level | Action | Security Description |
|---|---|---|
| Level 1 | Upload | Any user can upload document/file. |
| | Share | All documents/files pertaining to VCC domain are shared with all users of VCC domain by default. Additional access restrictions can be placed on documents/files by owner of documents/files, project manager and/or administrator. |
| | Download | Any user can download any document/file by default. |
| | Edit | Any user can edit any document/file by default. |
| | Decrypt | Any user can decrypt any document/file by default. |
| | Delete | Any user can delete any document/file by default. |
| Level 2 | Upload | Any user can upload documents/files. |
| | Share | All documents/files are shared with all users by default for viewing only by default. Additional access restrictions can be placed on documents/files by owner or project manager. |
| | Download | User must request permission from owner. |
| | Edit | User must request permission from owner. |
| | Decrypt | Any user can decrypt any document/file by default. Managed decrypt permissions. As an alternative, document/file owner is able to decrypt and for all other users document/file owner approval is needed. |
| | Delete | Document/file owner can delete. For all other users owner approval is needed. |
| Level 3 | Upload | Any user can upload files. |
| | Share | Documents/files are shared with all users by default for viewing only by default. Additional access restrictions can be placed on documents/files by document owner, project manager and/or administrator. |

TABLE 1-continued

Sample Authorization Levels

| Level | Action | Security Description |
|---|---|---|
| | Download | Team members must request permission from document/file owner.<br>Non-team members need counterpart project manager approval. |
| | Edit | Team members must request permission from document/file owner, project manager and/or administrator.<br>Non-team members need counterpart project manager approval. |
| | Decrypt | Any user granted edit permissions can de-crypt shared documents/files by default.<br>Managed decrypt permissions.<br>As an alternative, document/file owner can decrypt. For team members, document/file owner approval is needed.<br>For non-team members, counterpart project manager approval is needed. |
| | Delete | Document/file owner can delete.<br>For team members, document/file owner approval is needed.<br>For non-team members, counterpart project manager approval is needed. |
| Level 4 | Upload | Any user can upload documents/files. |
| | Share | For all members, document/file owner, project manager and/or administrator approval is needed.<br>Additional access restrictions can be placed on documents/files by document owner, project manager and/or administrator. |
| | Download | Team members must request permission from document/file owner.<br>Non-team members need counterpart project manager approval. |
| | Edit | Team members must request permission from document/file owner or team project manager.<br>Non-team members need counterpart project manager approval. |
| | Decrypt | Document/file owner can decrypt document.<br>For team members, document/file owner or project manager approval is needed.<br>For non-team members, counterpart project manager approval is needed. |
| | Delete | Document/file owner can delete.<br>For team members, document/file owner or project manager approval is needed.<br>For non-team members, counterpart project manager approval is needed. |
| Level 5 | Upload | Any user can upload documents/files. |
| | Share | For all members, team project manager approval and counterpart project manager approval is needed. |
| | Download | For all members, team project manager approval and counterpart project manager approval is needed. |
| | Edit | For all member, team project manager approval and counterpart project manager approval is needed. |
| | Decrypt | Document/file owner can decrypt document.<br>For all members, team project manager approval and counterpart project manager approval is needed. |
| | Delete | Document/file owner can delete.<br>For all members, team project manager approval and counterpart project manager approval is needed. |

The permission set of the user may indicate permissions of the user and/or the user device 12. The permissions may indicate whether the user is permitted to view, upload, download, edit, share, decrypt, and/or perform other actions to one or more documents and/or files. The term "view" may refer to viewing a document/file on the user device 12. The viewing may be via a web browser or application executed on the user device 12. The web browser may open a website of the VCC system 10 for access to documents/files in the VCC system 10. The website may be administered by the DMS 20. The terms "upload" and "download" refer to the uploading and downloading of documents/files between the user device 12 and the VCC system 10, the DMS 20 and/or other server of the VCC system 10. The term "share" refers to the sharing of a document and/or file between the user device 12 and another user device via the VCC system 10. The term "decrypt" refers to the decrypting of documents and/or files via the DRM module 30 of the user device 12, which have been downloaded from the VCC system 10 and/or a server in the VCC system 10 to the user device 12.

Subsequent to receiving the profile of the user, the VCC domain controller 29 provides the profile and/or the permission set for the user to the DMS 20 for creation of the account by the DMS 20. The permission set may be created by the VCC domain controller 29 and/or the DMS controller 36 and may be based on inputs received from the user device of the user creating the account. The permission set may be based on instructions received from a device of a project manager and/or administrator by the DMS 20. The DMS 20 creates unique identifiers for the new user and/or user device. The DMS 20 saves an updated profile for the new user and/or user device and publishes the permissions by transferring DRM permissions to the control center server 24. The DRM permissions stored in the control center server 24 are bound to the user profile as stored in the DMS 20. The DRM permissions may be shared with any of the servers (e.g., one of the servers 26, 28) of the VCC system 10. The DMS controller 36, a device of a project manager, document or file owner, and/or administrator may send an email to the user device 12 indicating that an account has been created and requesting the user login and create a username and password. The DMS controller 36 may instruct the mail server controller 32 to send the email.

A second scenario is referred to as the "login scenario" and includes the user device 12, subsequent to account creation, logging in to the VCC system 10. The user device 12 and/or a controller of the user device 12 sends a login request to the DMS 20, which may include a user identifier, unique identifier, username, password, and/or other credential information. This may include an exchange of information with the DMS 20. The DMS 20 then verifies whether the user and/or user device 12 are authorized for access to the VCC systems 10.

Another scenario is referred to as the "upload scenario" and includes the user device 12 uploading a document and/or file to the DMS 20. The DMS 20 encrypts the document/file. The encrypted document/file has a security level as placed on the document/file by the user device 12 and/or owner of the document/file. The security level may correspond to one of the authorization levels disclosed above. The encrypted document/file may be stored in the DMS 20 and/or other server of the VCC system 10.

Another scenario is referred to as the "download scenario" and includes the DMS 20 downloading a document/file to the user device 12. The document/file may be encrypted. The DRM controller 30 may verify authorization level of the user device to determine whether the user device is authorized to decrypt the document/file, is further described below. The upload and download scenarios may include one or more authorization verifications, as is further described below. The verification may occur prior to and/or subsequent to the corresponding upload or download.

Another scenario is referred to as the "view scenario" and includes a user being able to view a document via a secure viewer controller (one of the secure viewer controllers 108, 110). The user may view the document via a window of a web browser through which the user has logged into the VCC system 10. The user may alternatively download the document from the VCC system 10 and/or access the document stored on the user device 12. The secure viewer controller and/or the DRM controller 30 may then verify whether the user is authorized to view the document and if the user is authorized permit viewing of the document on the display 120.

The viewing of the document via the secure viewer controller in the web browser prevents the user from copying the document by, for example, right clicking on a mouse and saving the document. When the document is created and/or saved in the user device 12, the DMS 20, and/or other server of the VCC system 10, watermarks may be applied to the document. This may be done by the DRM controller 30, the DMS controller 36 and/or other controller in the VCC system 10. The watermarks may each include a name of the user, a username, a unique identifier of the user and/or the user device 12, a date, a time, an identification of a VCC instance, an identification of a VCC domain, and/or other information. The watermarks may be repeated across the document to deter copying, screen capturing, printing and/or taking pictures of the document.

Another scenario is referred to as the "dashboard scenario". This scenario includes the user device 12 selecting and accessing information pertaining to a dashboard. The user via the web browser may select a dashboard and information for that dashboard may be downloaded from the database server 18 to the user device 12 via the DMS 20 and/or uploaded from the user device 12 to the database server 18 via the DMS 20. In selecting the dashboard, the user may select a dashboard from a list of dashboards, select a link in the web browser corresponding to a dashboard, and/or may enter a link (e.g., uniform resource locator (URL) link) to view the dashboard. The DMS 20 may determine whether the user is permitted to access the selected dashboard. This may be based on the authorization level of the user and/or user device 12. If the user and/or user device 12 is authorized, then the selected dashboard and/or corresponding table may be opened in the web browser and populated with data corresponding with that dashboard. Watermarks may also be displayed over the displayed dashboard. These watermarks may be similar or the same as the watermarks described above with respect to documents. The data corresponding to the dashboard may refer to business information, such as sales numbers, product information, internal or external user experiences, performance numbers, and/or other business information.

Another scenario is referred to as the "share scenario". This includes a first user device sharing a document and/or file with a second user device. Although a single user device is shown in FIGS. 1-2, any number of user devices may be connected to the VCC system 10. Each of the user devices may be configured similar to the user device 12. During a share event, a first user device shares a document and/or file with a second user device. This may include the first user device requesting that an email be sent to the second user device via the mail server 16. The first user device may send a signal to the mail server controller 32 requesting that an email be sent to the second user device. The email may indicate DRM permissions for the second user device and/or user of the second user device pertaining to the document/file. The email may also include a password, login identifier (ID), document name, file name, unique ID, URL link to access the VCC system and document/file, and/or other information indicating how the document/file can be accessed. The DMS 20 may also send DRM permissions to the control center server 24 to publish the DRM permissions for the second user and/or second user device. This may be initiated by a request sent from the first user device to the DMS server indicating that a document/file is to be shared and information pertaining to the second user and/or second user device. This information may include the DRM permissions, IDs of the second user and second user device, password, unique IDs, and/or links. During the share event, the second user may view the document via one of the secure viewer controllers 108, 110 via a web browser on the second user device and/or the document may be downloaded as described herein to the second user device. The second user device may then display, edit, and/or decrypt the document.

Another scenario is referred to as the "revoke scenario". A first user (e.g., a document/file owner, a project manager, and/or an administrator), via a first user device, may revoke access to a document/file by a second user device of a second user. The first user may select the document/file and change permissions for that document/file to prevent the VCC system 10 and/or the second user device from being able to access and/or display the document/file for the second user. The DMS 20, based on a request from the first user device, may send updated DRM permissions to the control center server 24. Authorization policies and/or DRM permissions associated with the user are updated in the DMS 20. These permissions, as described above, are shared with the servers 26, 28. If the second user attempts to access the document/file, the DMS 20, the severs 26, 28 and/or the DRM controller of the second user device prevents accessing and/or viewing of the document/file. The policy server controller 42 controls distribution of policies out of the collaboration server 26, which are then available for the DRM module in the second user device to ping. The authorization policies and/or DRM permissions may be distributed and/or updated periodically and/or at a predetermined rate. Frequency of updating may occur at a faster frequency at which a DRM module of a user device pings the secure collaboration server 26 for the updates. The authorization policies and/or DRM permissions may be manually created, updated and/or deleted by a user at the policy server 28.

A user device is able to access documents/files stored in the VCC system 10 for which a user of the user device is authorized to access. Other documents/files in the VCC system 10 for which the user is not authorized to access are not accessible and the names, identifiers, links of which are not shown to the user. Thus, the user is unaware of the other documents stored in the VCC system 10.

Figure 3:
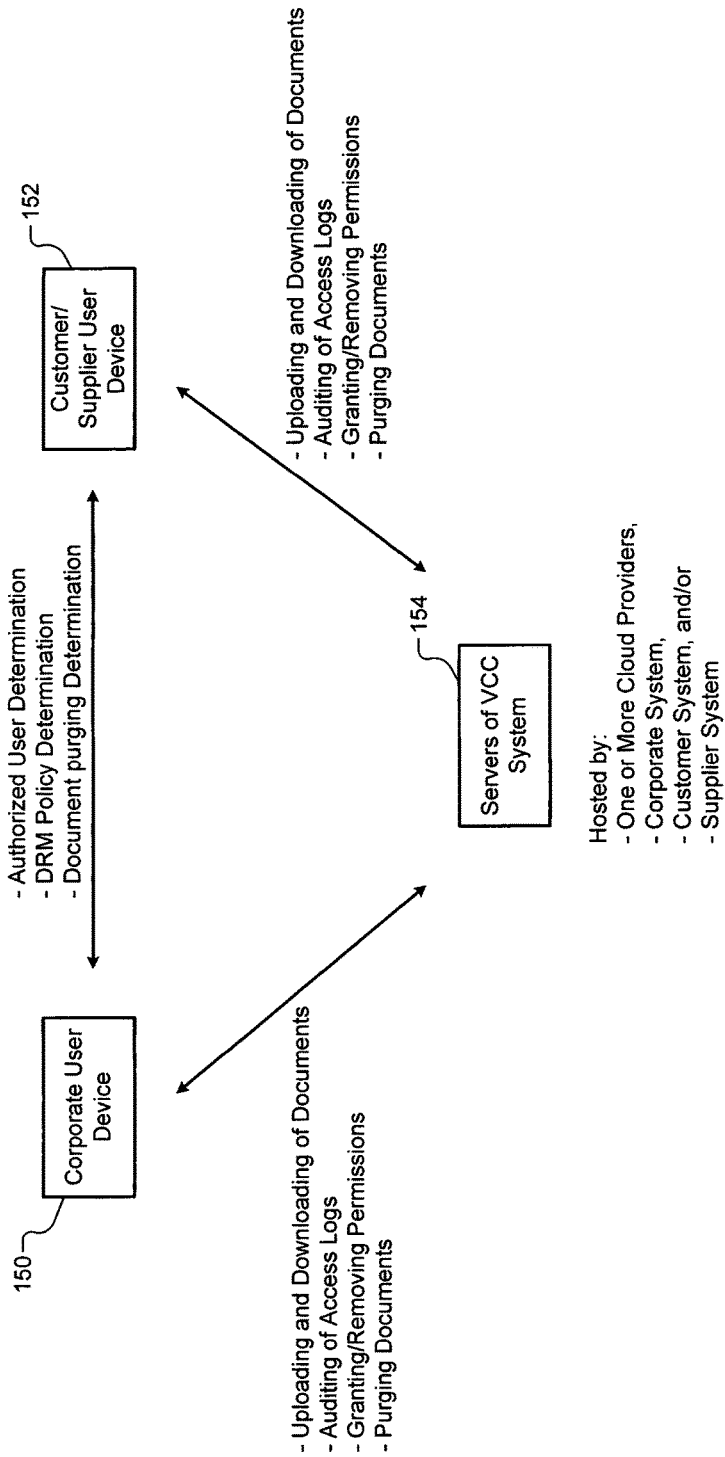
FIG. 3 is functional block diagram illustrating exchanges of information in accordance with the present disclosure.

The above-sated scenarios are further described below with respect to FIGS. 3-11. FIG. 3 illustrates exchanges of information between a corporation user device 150, a customer or supplier user device 152 and servers 154 of the VCC system 10 of FIGS. 1-2. The user devices 150, 152 may be configured similar to the user device 12 of FIGS. 1-2.

Users (e.g., employees, project managers, etc.) of the user devices 150, 152 may jointly agree on: authorized users and/or user devices and corresponding authorization levels and permissions; documents and/or files to be shared; document/file purging parameters; and/or other parameters and implement these parameters via the VCC system 10. The purging parameters may refer to the purging of documents and/or files after a predetermined period has passed since creation and/or since a last access of the documents and/or files. The purging parameters may also include the purging of accounts after a predetermined period and/or a last access by a user and/or a user device.

The user devices 150, 152 may, as shown: upload and/or download documents to and from the servers 154; audit access logs of the documents/files for the corresponding VCC domain and/or VCC instances; grant and/or remove permissions; purge documents and/or files; and/or purge accounts. If a document, file and/or account is deleted, a certificate of deletion may be created by the user devices 150, 152, the DMS 20 of the VCC system 10, and/or other one of the servers 154. As an example, the certificates of deletion may be stored in the DMS 20 or other ones of the servers 154.

The VCC system 10 of FIGS. 1-2 provides a unique highly secure cloud based collaboration system for the sharing of sensitive documents (e.g., documents directed to intellectual property) between two or more parties. Functionality of the servers within the VCC system 10 is further described below.

The VCC domain server 14 is a dedicated directory service (domain controller) that authenticates and authorizes users and user devices in the VCC system 10 and provides for provisioning of users through integration with other domain controllers. The provisioning of users includes acquiring and/or setting up profiles of users and setting up accounts. The VCC domain controller 29 responds to security authentication requests (logging in, checking permissions, etc.) within a domain. Since each VCC instance exists for a corresponding VCC domain, security is improved by having a dedicated domain controller. This eliminates risk of users being assigned inappropriate policies and/or permissions and/or having access to a wrong set of documents. The VCC domain controller 29 communicates with other domain controllers (e.g., the corporate domain controller 130 or other domain controller 156 of other domain server 158) in order to provide provisioning of users. Provisioning of users based on information from other domain controllers includes carrying over user information (or attributes) managed in the other domain controllers into the VCC domain controller 29. This significantly eases the creation and management of users in the VCC system 10 and reduces risk by enabling company roles based provisioning to be extended into the VCC system 10. The VCC domain controller 29 controls ability of users to login and which of the documents/files the users are able to access.

The mail server 16 is a dedicated email server that provides calendaring software and a contact managing software in addition to email service. The mail server 16 is configured in such a way that user generated emails are sent to addresses within the same VCC system/domain and/not to addresses outside the VCC system/domain. By providing a dedicated email server that is configured not to send emails and/or attachments outside of the VCC domain in which the mail server 16 exists, the VCC system 10 allows users to collaborate and communicate securely. This is accomplished while ensuring that documents and files do not leak outside of the VCC system/domain. If users need to share a document/file with another user by email, a link to the file may be created in the email and the recipient can follow the link, which opens if the recipient has sufficient permissions to access the document/file.

The database server 18 is dedicated for storing business intelligence data. The database server 18 collects and stores data that can then be used to populate dashboards. The data can come from mobile devices, corporate servers, and/or other servers connected to the VCC system 10. The data may come from servers of a company and/or suppliers and/or customers of the company. The data may be manually entered into the VCC system 10 and/or by uploading of files. As an example, a spreadsheet application (e.g., Excel®) file may be uploaded or the spreadsheet file may be automatically placed into a 'hot folder'. Once the data is in the database server 18, custom manipulations of the data may be performed to transform the data.

Data visualization (referred to as business reporting) may be performed by the database server 18. The database server 18 may execute a data visualization application for creation and presentation of dynamic dashboards. The dashboards allow presentation of data in an easily understood manner and allow users to 'drill down' into the data for better understanding purposes. Business intelligence visualization as performed by the database server 18 includes receiving raw data, manipulating the data, and displaying the manipulated data in 'dashboards' on user devices. The database server 18 may provide instant messaging of the data. The database server 18 may execute a dedicated, self-contained instant messaging application and thus be configured such that messages are sent to recipients within the same VCC system/domain. This allows users for a VCC instance to communicate and collaborate with each other and view and edit documents.

The DMS 20 via a configurator controller 159 (or configurator application running on the DMS controller 36) creates and deconstructs VCC instances, where each VCC instance is associated with one or more users and one or more corresponding user devices. The DMS 20 receives, stores, tracks, manipulates, filters, encrypts, transfers, shares, and manages documents/files and corresponding content. The DMS 20 receives profiles, permissions and/or login information from the VCC domain controller 29 and/or from the DRM system 22. The DMS 20 may create accounts for users, which may be ruled based. The documents/files may be shared within the VCC system 10 with a company and other parties. The DMS 20 is a dedicated content/document management system with workflow and task management capabilities. The DMS 20, in addition to providing a location to store and share documents and files, provides a system that incorporates: metadata for the tagging and categorization of files; document/file versioning with checking documents/files in and out; retrieving previous versions; tracking contributions to documents/files from different users and/or user devices; traceability of the locations of documents/files; configuration workflows to automate the sharing of documents/files; handling of requests for access to documents/files; deleting of documents/files; and searching to assist users in finding documents/files quickly.

The DMS 20 may execute a business process automation application to configure the VCC system 10 to automate commonly found conditions in agreements (e.g., joint development agreements, nondisclosure agreements, and/or collaboration agreements) and contracts used to govern relationships between two parties. This mutual accountability in configuring and managing the VCC system 10 and managing users and access to documents/files enhances adoption of documents/files by parties. Parties are able to maintain full control of files containing intellectual property content and access to the files.

The DMS 20 provides business process automation of tasks such as provisioning user accounts, approving or rejecting requests to access documents, and the sharing of documents via pre-built and configured workflows and automated tasks. The servers of the VCC system 10 and the DRM modules of user devices connected to the VCC system 10 provide a mutual accountability model, such that parties of a VCC instance equally share in configuring and controlling the VCC system 10. This includes selecting levels of security and configuring the VCC system 10 to conform to any governing documents such as contracts and agreements.

The DMS 20 may follow a standards-based framework to assure that the actions performed by the servers in the VCC system 10 and the DRM modules in the user devices follow appropriate standards. The framework allows for integration with other systems to share data. By complying with standards, the VCC system 10 may be easily integrated with existing parallel systems to support provisioning of users and sharing of data. The VCC system 10 is able to be integrated with existing corporate systems for the provisioning of users and sharing of data used to populate dashboards.

The mail server 16, the DMS 20, and the instant messaging performed by the DMS 20 provide collaboration and social tools. The VCC system 10 has a dedicated mail server 16, an instant messaging application, and a calendar application and is able to assign and manage tasks, discussion boards, and wikis. The collaboration tools include document sharing, document management, wiki discussion threads and search tools. The DMS 20 performs event logging, such that each activity within the VCC system 10 is logged and auditable at any moment in time by authorized users (company, supplier, customer and/or other user) in the corresponding VCC domain.

The DMS 20 generates certificates of deletion. For each document/file deleted a certificate of deletion is created and stored. The certificates can be accessed by the users of a VCC domain at any time.

The DRM system 22 and/or the DMS 20 execute a DRM application and encrypt documents/files upon upload. The DRM system 22 controls individual access for each user to each document/file through a policy-based model. The DRM application allows the document/file owners and managers of documents/files to control access to the documents/files. The DRM system 22, by communicating with DRM controllers of user devices, provides for revoking access to shared and downloaded documents/files by rendering the documents/files useless and inaccessible on the user devices. This is true for documents/files previously downloaded onto the user devices. The DRM system 22 controls access to documents/files via encryption and policy management in order to prevent unauthorized access and reproduction of information. DRM provides the ability for document/file owners and managers to revoke access to documents/files that have been downloaded to computers, rendering the documents unreadable and inaccessible. In addition to enabling DRM, the encryption of each document and file in the VCC system 10 throughout every stage of a lifecycle of the document/file assures the security of the corresponding data even if the VCC system 10 were hacked. The features of the DRM system 22 may be controlled by one or more of the servers 24, 26, 28.

The policy server 28 manages one or more policies and permissions of each user and/or user device directed to downloading, editing, and decrypting documents/files. A single user may have multiple user devices. Each policy may include one or more permissions. The policy server 28 stores and manages user permissions and policies, and is used by the DRM system 22 to validate access (or authorization) levels of each user for each document and file in the VCC system 10.

The DMS 20 and the policy server 28 have a pre-configured document and user management security levels, examples of which are shown in above Table 1. The VCC system 10 may have five different pre-configured document and user management configurations with corresponding workflows. These are selected jointly via the 'mutual accountability' model.

The secure collaboration server 26 allows for viewing of documents/files without allowing access to editing or downloading of the documents/files. The secure collaboration server 26 may receive document URLs and based on DRM polices received from the policy server 28 indicate whether the corresponding documents may be opened via the secure viewer controller 108. This may be indicated to the DMS 20, as shown in FIG. 2. The secure collaboration server 26 applies watermarks to displayed documents, files and/or dashboards in order to deter and track attempts at screen capturing or photographing the documents, files and/or dashboards being viewed. By providing a method for viewing documents/files without downloading the documents/files to user devices of users that simply need to view the documents/files rather than edit the documents/files, risk is reduced by keeping the documents/files completely in servers of the VCC system 10. The watermarks discourage bad actors from taking screen captures of the displayed documents/files or using a phone to take a picture of a display of a user device.

The DMS 20 and/or secure collaboration server 26 may include a secure viewer controller, as stated above. The secure viewer controller (e.g., one of the secure viewer controller 108, 110) allows users to securely view documents/files without giving full access for editing the documents/files. The secure viewer controller applies watermarks across each window shown in order to discourage screen captures and photography of the information displayed. The watermarks are customizable and, as an example, may display a username, date and time, a company confidential message, and/or other information as described above. The watermarks allow identification of leaks in the form of 'screen grabs'.

The control center server 24 may control timing of actions of the DMS 20, the policy server 28, and the secure collaboration server 26. Policies may be stored, updated and/or controlled by the control center server 24. The control center server 24 may also store information to allow the DMS 20 to operate.

The policy server 28, secure collaboration server 26 and collaboration of workflows by the DMS 20 provides business rule and policy automation. This may include automation of activities and requirements found in regulations and contracts, such as requirements for data retention and deletion (or destruction), document/file traceability, and positive access control to documents/files.

For further defined structure of the controllers of FIGS. 1-3 see below provided methods of FIGS. 4-12 and below provided definition for the term "controller". The systems, controllers and devices disclosed herein may be operated using numerous methods, example methods are illustrated in FIGS. 4-12. Although the methods of FIGS. 4-12 are shown as separate methods, one or more methods and/or tasks from separate methods may be combined and performed as a single method. Although the tasks are described as being performed by certain servers and controllers, the tasks may be performed by the corresponding server and/or controller. For example, a task performed by the DMS 20 may be performed by the DRM module 30 and vice versa.

Figure 4:
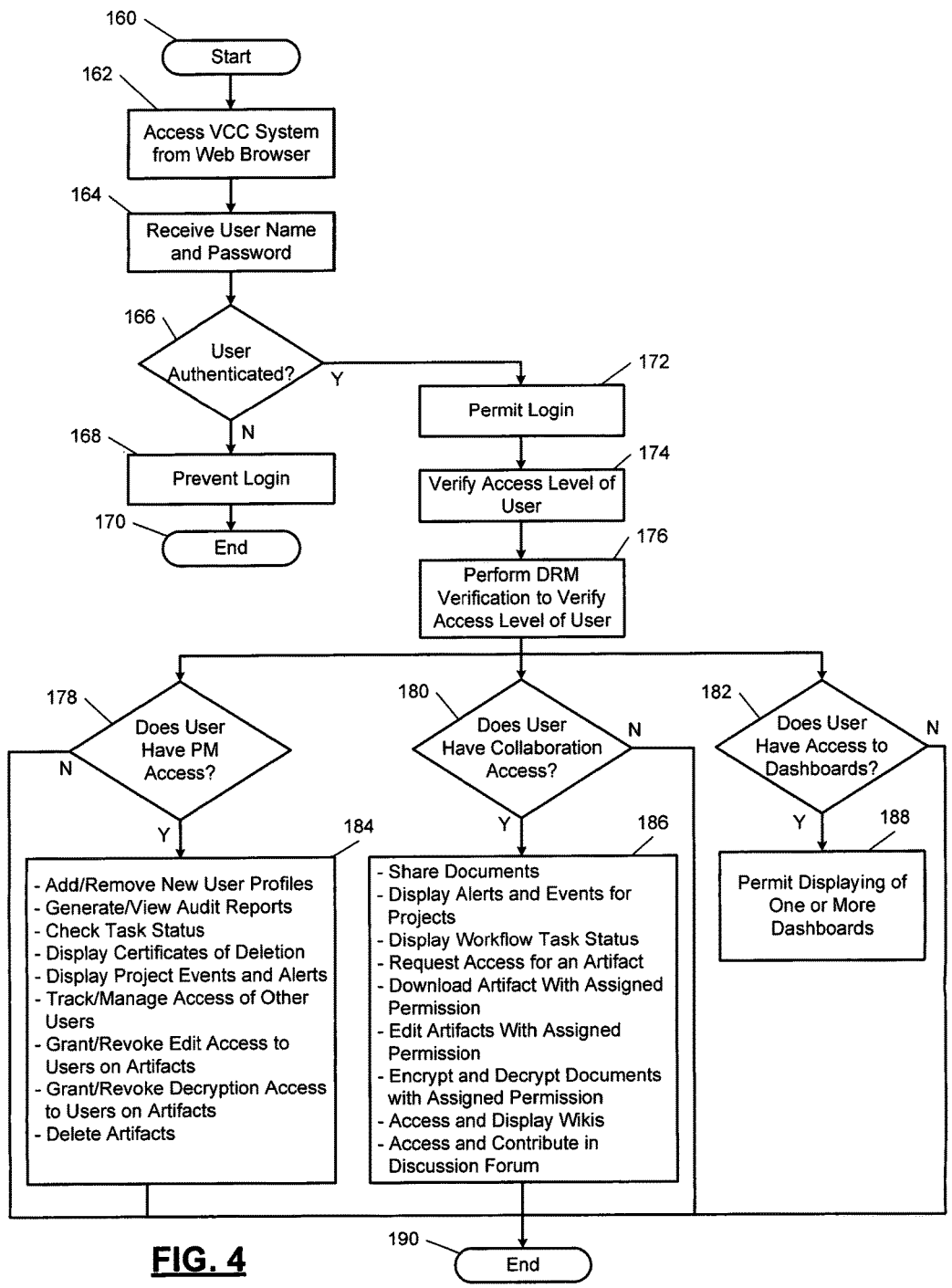
FIG. 4 illustrates an authentication and access method in accordance with the present disclosure.

FIG. 4 illustrates an authentication and access method. Although the following tasks are primarily described with respect to the implementations of FIGS. 1-3, the tasks may be easily modified to apply to other implementations of the present disclosure. The tasks may be iteratively performed.

The method may begin at 160. At 162, a user of a user device may access a website of the VCC system 10 via a web browser displayed on the user device. At 164, the user device may establish and/or enter a username and password through communication with the DMS 20, as described above. The DMS 20 and/or VCC domain controller 29 determine whether the user has a valid account and/or whether to permit a valid account to be established. The DMS 20 and/or VCC domain controller 29 may determine a profile, group ID, and/or workflow ID of the user and/or user device. This determines the documents and/or files for which the user and/or user device are permitted access. At 166, the VCC domain controller 29 may determine whether the user and/or user device is authorized to access a document/file. If the user and/or user device is authorized, task 172 is performed, otherwise task 168 is performed.

At 168, the VCC domain controller 29 indicates to the DMS 20 that the user and/or user device is not authorized and the DMS 20 prevents the user from logging in to the VCC system 10. The method may end at 170. At 172, the VCC domain controller 29 indicates to the DMS 20 that the user and/or user device is authorized and the DMS 20 permits the user to log in to the VCC system 10.

At 174, the DMS 20, the VCC domain controller 29 and/or one of the servers of the DRM system 22 may verify authorization levels of the user and/or user device. This may include determining whether a profile of the user is valid and/or corresponds to the group ID and/or the workflow ID. At 176, a DRM controller of the user device may perform a DRM verification to verify an authorization level of the user and/or user device. This may include exchange of signals and/or DRM permissions between the DRM controller and the secure collaboration server 26. The secure collaboration server 26 may request DRM permissions for the user and/or user device from the policy server 28. Below described DRM verifications may be performed as the DRM verification performed at 176.

At 178, the DMS 20, the VCC domain controller 29 and/or one of the servers of the DRM system 22 may determine whether a first authorization (or access level) of the user is associated with being a project manager and/or is at a first predetermined access level. If the first authorization level corresponds to being a project manager and/or is at the first predetermined level, then task 184 is performed, otherwise the method may end at 190.

At 180, the policy controller 42 determines whether the user and/or user device has collaboration access and/or a second predetermined access level. If the user and/or user device has collaboration access and/or a second predetermined access level, task 186 is performed, otherwise the method may end at 190.

At 182, the VCC domain controller 29 determines whether the user and/or user device has access to dashboards and/or a third predetermined access level. The first, second and third predetermined access levels may be different. The first predetermined access level may be higher than the second predetermined access level and the second predetermined access level may be higher than the third predetermined access level. If the user and/or user device has the third predetermined access level, task 188 is performed, otherwise the method may end at 190. Each of tasks 178, 180, 182 may be performed while the other ones of tasks 178, 180, 182 are performed.

At 184, the VCC domain controller 29, the DMS 20, and the DRM controller permit the user device to: add and remove new user profiles from the VCC system 10; generate and view audit reports; check task statuses; display certificates of deletion; display project events and alerts; track and manage access of other users; grant and revoke edit access to users on artifacts; grant and revoke edit access to users on artifacts; grant and revoke decryption access to users on artifacts; and delete artifacts.

At 186, the DMS 20 and the DRM controller permit the user device to: share documents; display alerts and events for projects; display workflow task statuses; request access to an artifact; download artifacts with assigned permissions; edit artifacts with assigned permissions; encrypt and decrypt documents with assigned permissions; access and display wikis; and access and contribute in discussion forums. An artifact may refer to a document, file or other object created by multiple users via respective user devices.

At 188, the VCC domain controller 29, the DMS 20, and the DRM controller permit the user device to display one or more dashboards for which the user and/or user device is authorized to view. Each of tasks 184, 186, 188 may be performed while the other ones of tasks 184, 186, 188 are performed.

Figure 5:
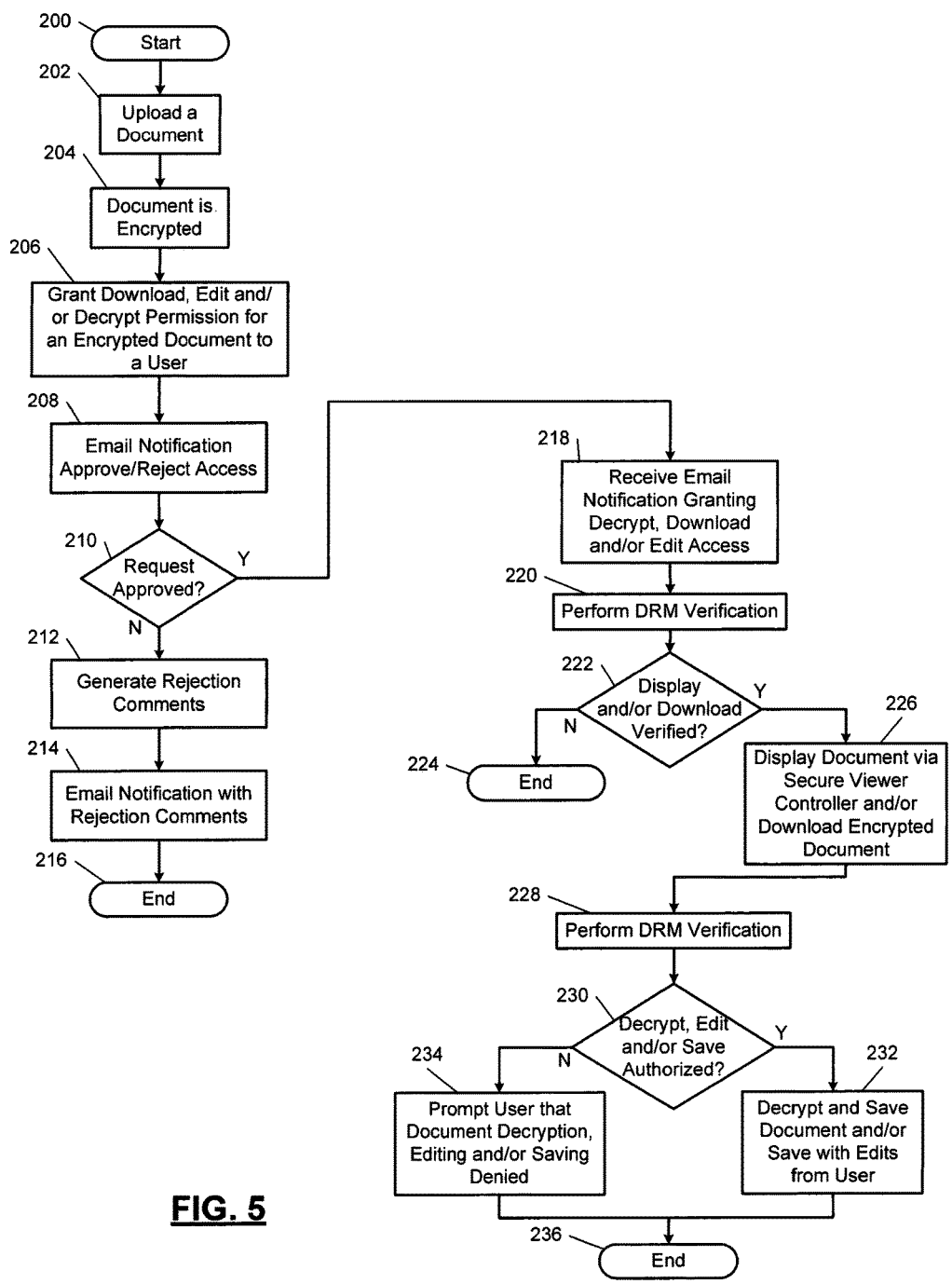
FIG. 5 illustrates a method of uploading and sharing a document in accordance with the present disclosure.

In FIG. 5, a method of uploading and sharing a document is shown. Although the following tasks are primarily described with respect to the implementations of FIGS. 1-3, the tasks may be easily modified to apply to other implementations of the present disclosure. The tasks may be iteratively performed.

The method may begin at 200. At 202, a document is uploaded from a first user device (e.g., the user device 12 or other user device) to the DMS 20. This may occur via a web browser of the user device and the website of the VCC system 10. The first user device may be a device of a manager of a corporation. At 204, the DMS 20 may encrypt the document. At 206, the DRM 20, based on policy information, may grant access (view, download, edit, decrypt and/or other permissions) for the encrypted document, to a user and/or one or more user devices.

At 208, the DMS 20 may request the mail server 16 to send an email notification to a second user device (e.g., a user device of a counterpart manager, such as a manager of a supplier or customer). The email notification is sent to request approval of access to the document. At 210, if the second user device approves the access, task 218 is performed, otherwise task 212 is performed.

At 212, the second user device, based on inputs from the second user, generates rejection comments. At 214, the second user device requests that the mail server 16 send an email notification to the first user device indicating the rejection comments with regard to rejection of the requested access. The method may end at 216.

At 218, the first user device and/or other user device authorized to access the uploaded document may receive an email notification from the mail server 16 granting the requested access. This email notification may be initiated by the second user device.

At 220, the DRM controller of the first user device and/or of the other user device having access to the document may perform a DRM verification to verify that the first user, the first user device or the other user/user device is authorized. This may include exchange of signals and/or DRM permissions between the DRM controller and the secure collaboration server 26. The secure collaboration server 26 may request DRM permissions for the first user and/or first user device from the policy server 28. Below described DRM verifications may be performed as the DRM verification performed at 220.

At 222, if viewing and/or downloading of the document is authorized, task 226 is performed, otherwise the method may end at 224. At 226, the document is displayed as controlled by one of the secure viewer controller 108, 110 and/or the document is downloaded to the first user device or the other user device. At 228, the DRM controller may verify authorization to decrypt, edit and/or save the document. This may include exchange of signals and DRM permissions between the DRM controller and the collaboration server 26. A document may be downloaded at a first time and opened, decrypted, and/or edited at a second time. Permissions may change between the first time and the second time and/or subsequent to the second time. This may affect access to the document subsequent to download.

At 230, if decryption, editing and/or saving is authorized, task 232 is performed, otherwise, task 234 is performed. At 232, the receiving user device may decrypt, edit and/or save the downloaded document. At 234, the first user and/or other user may be prompted that decryption, editing and/or saving is denied. The method may end at 236.

Figure 6:
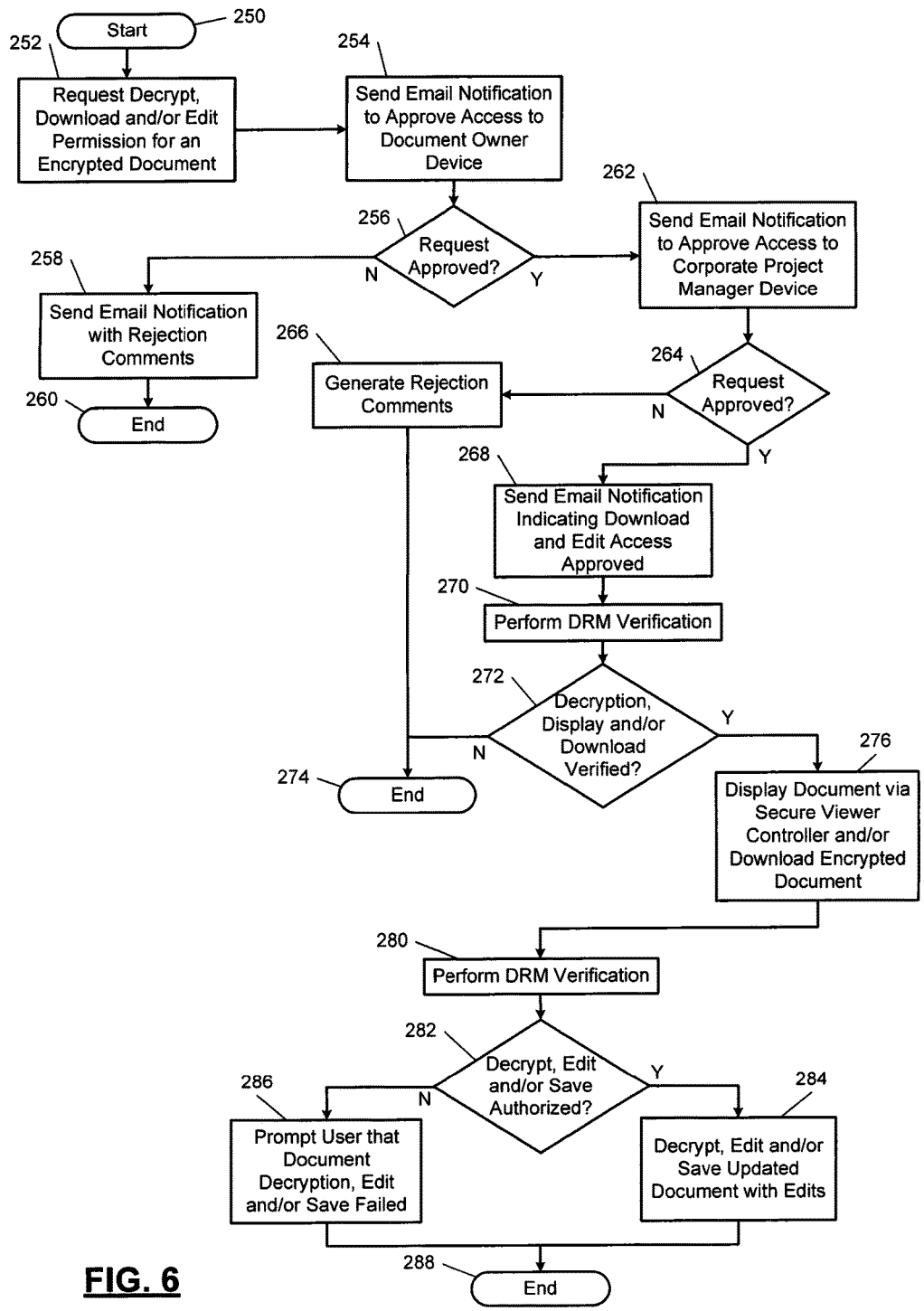
FIG. 6 illustrates a method of providing access to a document in accordance with the present disclosure.

FIG. 6 shows a method of providing access to a document. Although the following tasks are primarily described with respect to the implementations of FIGS. 1-3, the tasks may be easily modified to apply to other implementations of the present disclosure. The tasks may be iteratively performed.

The method may begin at 250. At 252, a requestor via a first user device may signal the DMS 20 to request decryption, download and/or edit permission for an encrypted document. This may occur via a web browser of the first user device and the website of the VCC system 10.

At 254, the DMS instructs the mail server 16 to send an email notification to the owner of the encrypted document. At 256, if the owner approves the requested access via a second user device, task 262 is performed, otherwise task 258 is performed.

At 258, if the request is denied, the DMS 20 may instruct the mail server 16 to send an email notification with rejection comments to the first user device. The method may end at 260.

At 262, the DMS 20 may instruct the mail server 16 to send another email notification to a third user device of a counterpart manager (e.g., customer or supplier manager) requesting the access. At 264, if the access is approved by the third user device, task 268 is performed, otherwise task 266 is performed. At 266, the DMS 20 may generate rejection comments, which may be sent to the first user device.

At 268, another email notification indicating download and/or edit access is approved. This may include the DMS 20 instructing the mail server 16 to send the approved access email to the first user device.

At 270, a DRM controller of the first user device verifies authorization to decrypt, display and/or download the document. This verification is similar to that described above and includes communication with the secure collaboration server 26.

At 272, if the decryption, display and/or downloading is authorized, task 276 is performed, otherwise the method may end at 274. At 276, the document may be displayed via a secure viewer controller at the first user device and/or downloaded to the first user device. This may performed via a web browser of the first user device and the website of the VCC system 10.

At 280, another DRM verification may be performed to verify authorization to decrypt, edit and/or save the document. At 282, if the decryption, editing and/or saving is authorized, task 284 is performed, otherwise task 286 is performed. At 284, the document may be decrypted, edited and/or the edited document may be saved at the first user device. At 286, the user is prompted via the first user device that the decryption, editing and/or saving of the document is denied. The method may end at 288.

Figure 7:
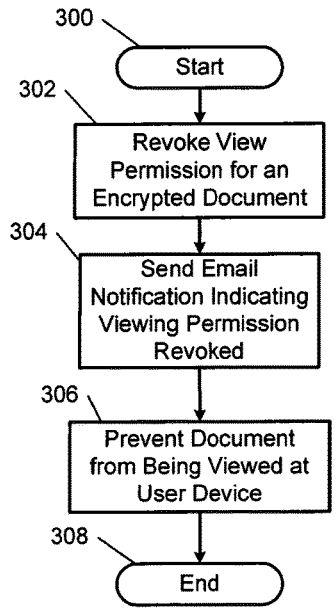
FIG. 7 illustrates a method of revoking viewing permission to a document in accordance with the present disclosure.

FIG. 7 shows a method of revoking viewing permission to a document. Although the following tasks are primarily described with respect to the implementations of FIGS. 1-3, the tasks may be easily modified to apply to other implementations of the present disclosure. The tasks may be iteratively performed.

The method may begin at 300. At 302, a first user device may revoke viewing of an encrypted document by user and/or displaying of the document on a second user device. This may include sending a request signal to the DMS 20 and updating permission in the control center server 24. This may performed via a web browser of the first user device and the website of the VCC system 10.

At 304, the DMS 20 instructs the mail server 16 to send an email notification indicating permission to view is revoked to the user and/or second user device.

At 306, the DRM controller of the second user device prevents viewing of the document, based on communication with the secure collaboration server 26. The method may end at 308.

Figure 8:
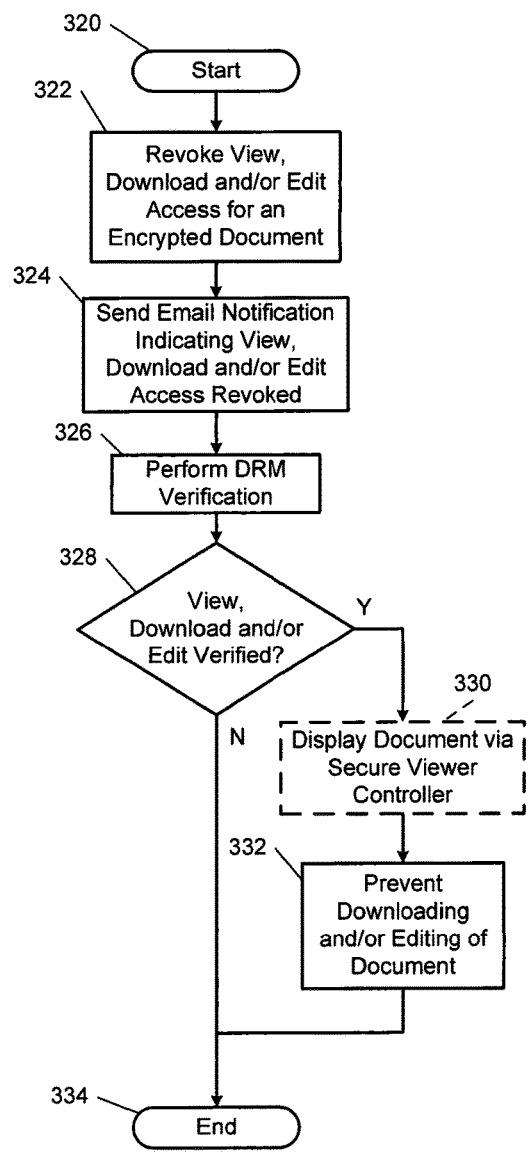
FIG. 8 illustrates a method of revoking viewing, downloading and/or editing permissions of a document in accordance with the present disclosure.

FIG. 8 shows a method of revoking viewing, downloading and/or editing permissions of a document. Although the following tasks are primarily described with respect to the implementations of FIGS. 1-3, the tasks may be easily modified to apply to other implementations of the present disclosure. The tasks may be iteratively performed.

The method may begin at 320. At 322, a first user device of a first user may revoke displaying, downloading, and/or editing of an encrypted document by a second user device of a second user. This may include sending a request signal to the DMS 20 and updating permissions in the control center server 24. This may performed via a web browser of the first user device and the website of the VCC system 10.

At 324, the DMS 20 instructs the mail server 16 to send an email notification indicating permission to display, download and/or edit is revoked to the second user device.

At 326, a DRM controller of the second user device may perform a DRM verification. At 328, if the viewing, downloading and/or editing is verified as being revoked, task 330 is performed, otherwise the method may end at 334.

At 330, the document may be displayed on the second user device via one of the secure viewer controllers 108, 110 depending on whether viewing has not been revoked. At 332, the downloading and/or editing of the document may be prevented by the DRM controller. This may be based on communication with the secure collaboration server 26 and/or policy server 28, as described above. The method may end at 334.

Figure 9:
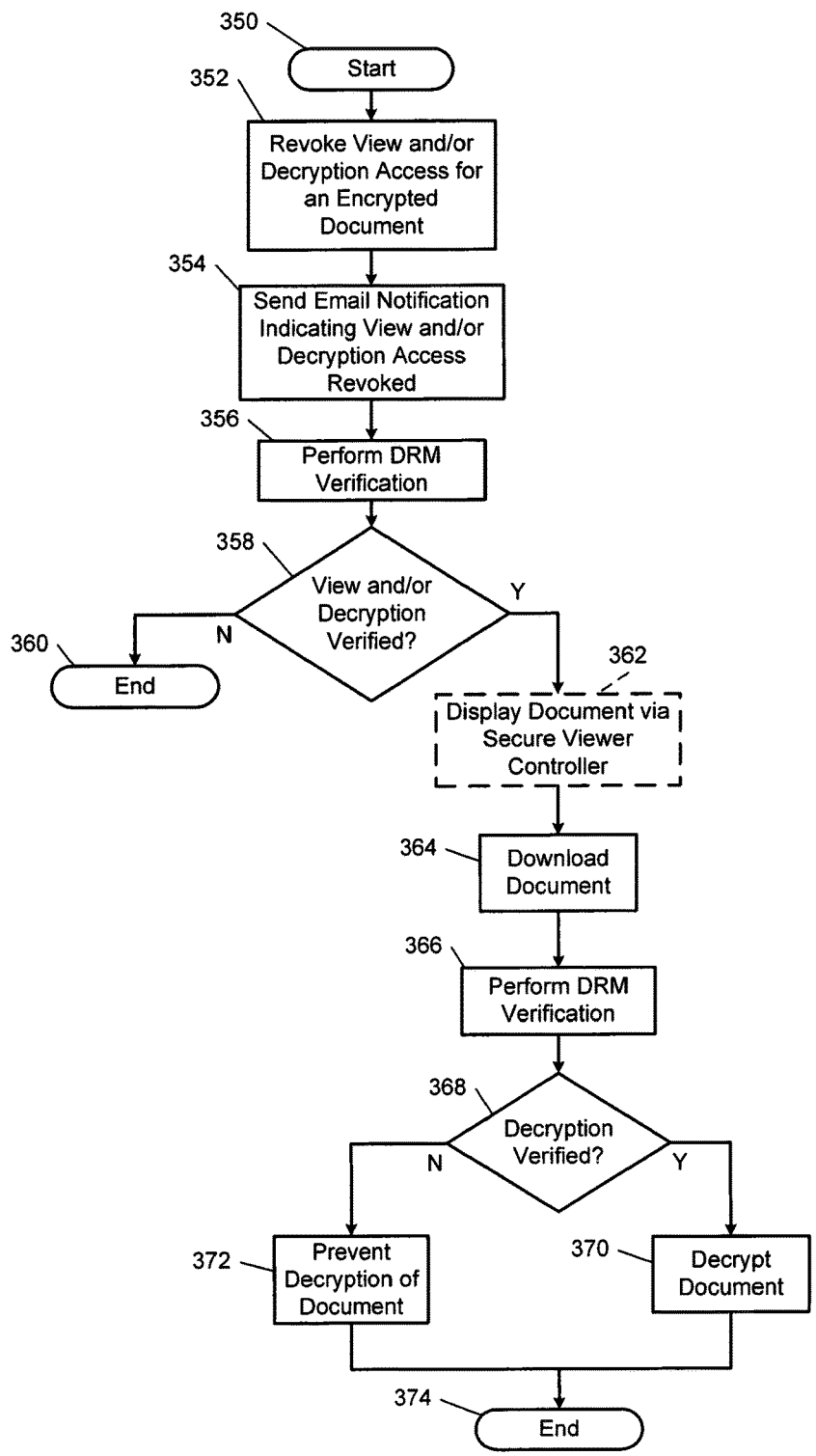
FIG. 9 illustrates a method of revoking viewing and/or decryption permissions of a document in accordance with the present disclosure.

FIG. 9 shows a method of revoking viewing and/or decryption permissions of a document. Although the following tasks are primarily described with respect to the implementations of FIGS. 1-3, the tasks may be easily modified to apply to other implementations of the present disclosure. The tasks may be iteratively performed.

The method may begin at 350. At 352, a first user device of a first user may revoke displaying and/or decrypting an encrypted document by a second user device of a second user. This may include sending a request signal to the DMS 20 and updating permissions in the control center server 24. This may performed via a web browser of the first user device and the website of the VCC system 10.

At 354, the DMS 20 instructs the mail server 16 to send an email notification indicating permission to display and/or edit is revoked to the second user device. At 356, a DRM controller of the second user device performs a DRM verification.

At 358, if the viewing and/or decryption is verified as being revoked, then task 362 is performed, otherwise task 360 is performed. The method may end at 360.

At 362, the document may be displayed via one of the secure viewer controllers 108, 110 on the second user device depending on whether viewing has not been revoked. At 364, the document may be downloaded to the second user device.

At 366, the DRM controller performs another DRM verification. At 368, if decryption has not been revoked, task 370 is performed, otherwise task 372 is performed. At 370, the second user device decrypts the document via the DRM controller. At 372, the DRM controller prevents the decryption of the document. The method may end at 374.

Figure 10:
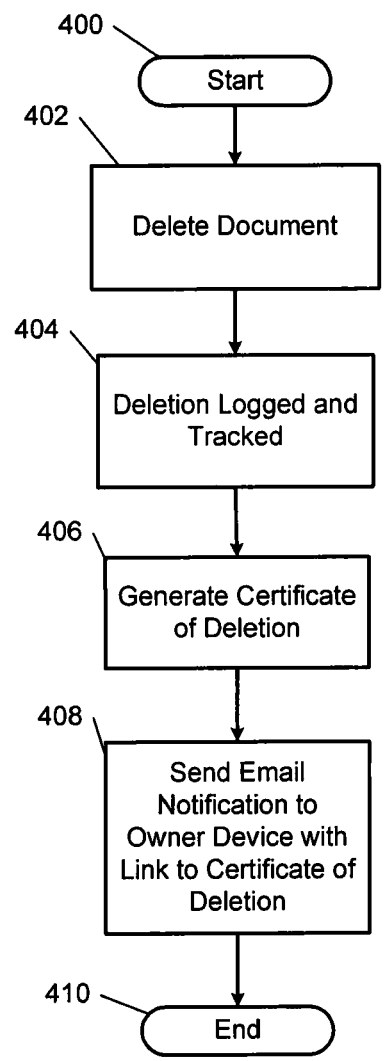
FIG. 10 illustrates a method of deleting a document by document owner and in accordance with the present disclosure.

FIG. 10 illustrates a method of deleting a document by document owner. Although the following tasks are primarily described with respect to the implementations of FIGS. 1-3, the tasks may be easily modified to apply to other implementations of the present disclosure. The tasks may be iteratively performed.

The method may begin at 400. At 402, the document owner may request that a document be deleted from the VCC system 10. This may include a first user device of the document owner sending a request signal to the DMS 20 to delete the document and the DMS deleting the document. This may performed via a web browser of the first user device and the website of the VCC system 10.

At 404, the DMS 20 logs and tracks deletion of the document. At 406, the DMS 20 may generate a certificate of deletion. At 408, the DMS 20 instructs the mail server 16 to generate an email notification to the document owner with a link to the certificate of deletion. The method may end at 410.

Figure 11:
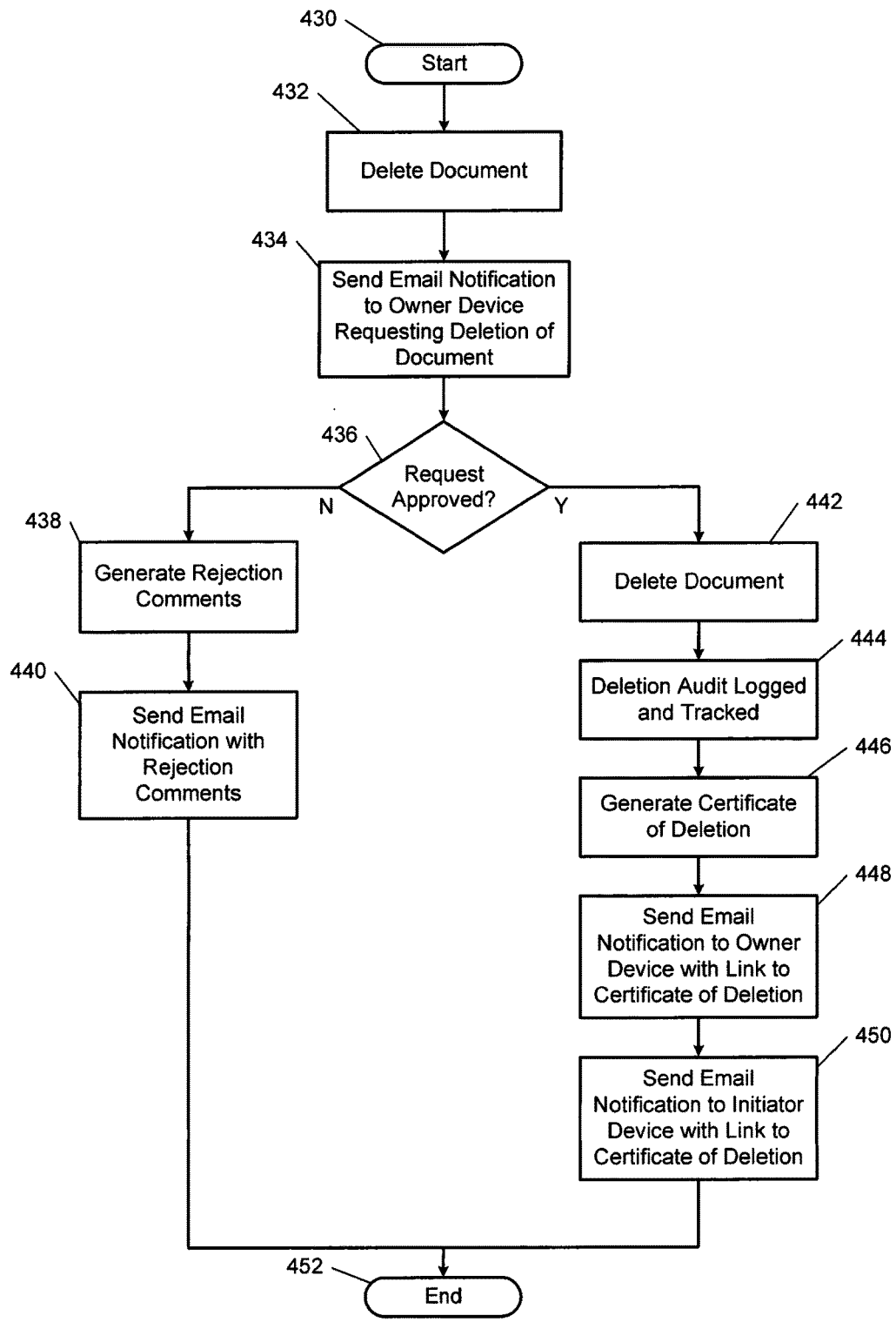
FIG. 11 illustrates a method of deleting a document by a non-owner of the document in accordance with the present disclosure.

FIG. 11 illustrates a method of deleting a document by a non-owner of the document. Although the following tasks are primarily described with respect to the implementations of FIGS. 1-3, the tasks may be easily modified to apply to other implementations of the present disclosure. The tasks may be iteratively performed.

The method may begin at 430. At 432, the document owner or other user may request that a document be deleted from the VCC system 10. This may include a first user device of the user sending a request signal to the DMS 20 to delete the document and the DMS deleting the document. This may performed via a web browser of the first user device and the website of the VCC system 10.

At 434, the DMS 20 may instruct the mail server 16 to send an email notification to the document owner requesting deletion of the document. At 436, if the document owner approves deletion of the document, task 442 is performed, otherwise task 438 is performed.

At 438, the document owner via a second user device sends a signal to the DMS 20 rejecting deletion of the document and the DMS generates rejection comments. At 440, the DMS 20 instructs the mail server 16 to send an email notification with the rejection comments to the first user device (or the user of the first user device).

At 442, the document owner via the second user device sends a signal to the DMS 20 accepting deletion of the document and the DMS deletes the document. At 444, the DMS 20 logs and tracks the deletion of the document. At 446, the DMS 20 generates a certificate of deletion.

At 448, the DMS 20 instructs the mail server 16 to send an email notification to the document owner with a link to the certificate of deletion. At 450, the DMS 20 instructs the mail server 16 to send an email notification to the first user device (or user of the first user device) with a link to the certificate of deletion. The method may end at 452.

Figure 12A:
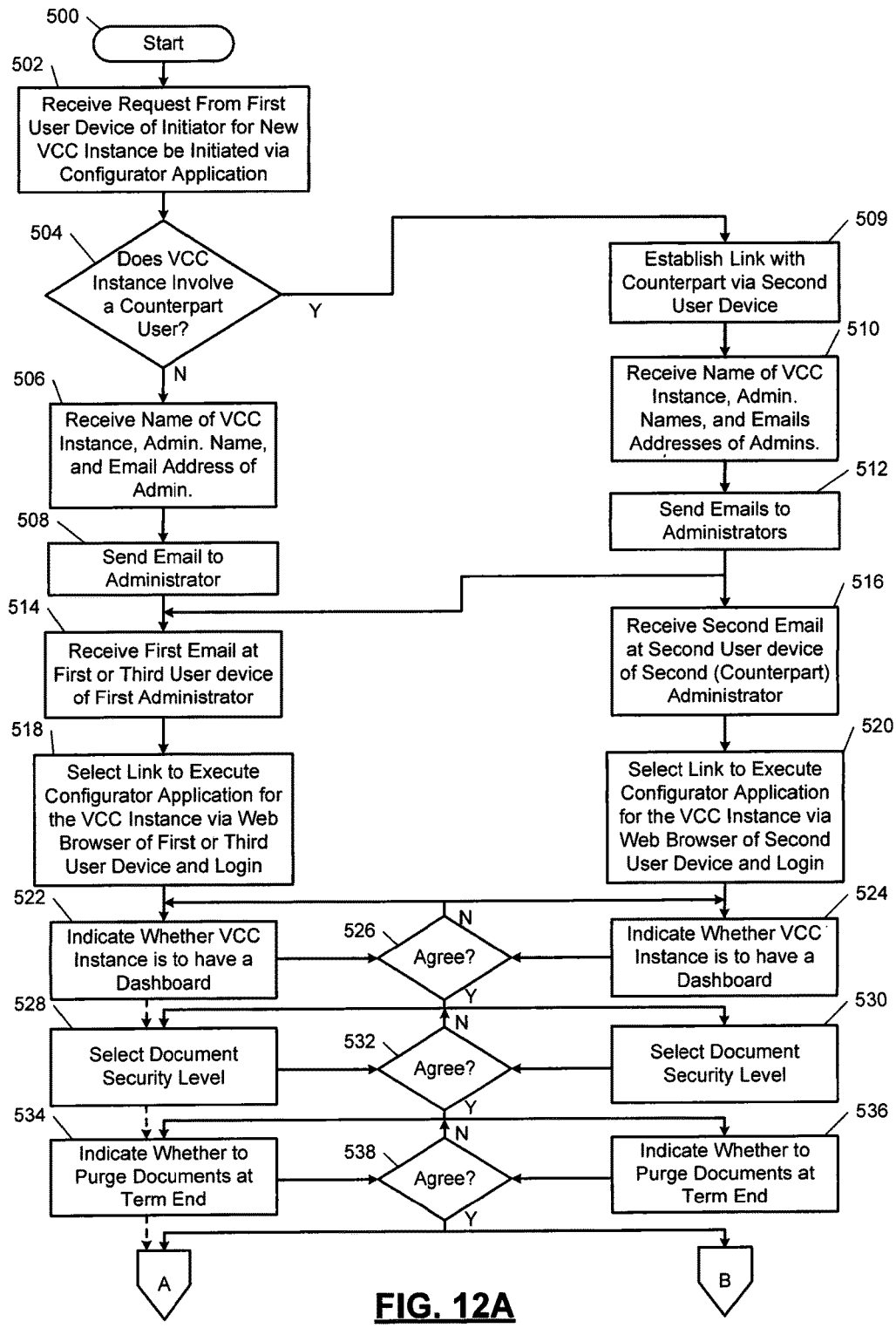
FIGS. 12A and 12B (collectively FIG. 12) illustrates a method of configuring a VCC instance in accordance with an embodiment of the present disclosure.
Figure 12B:
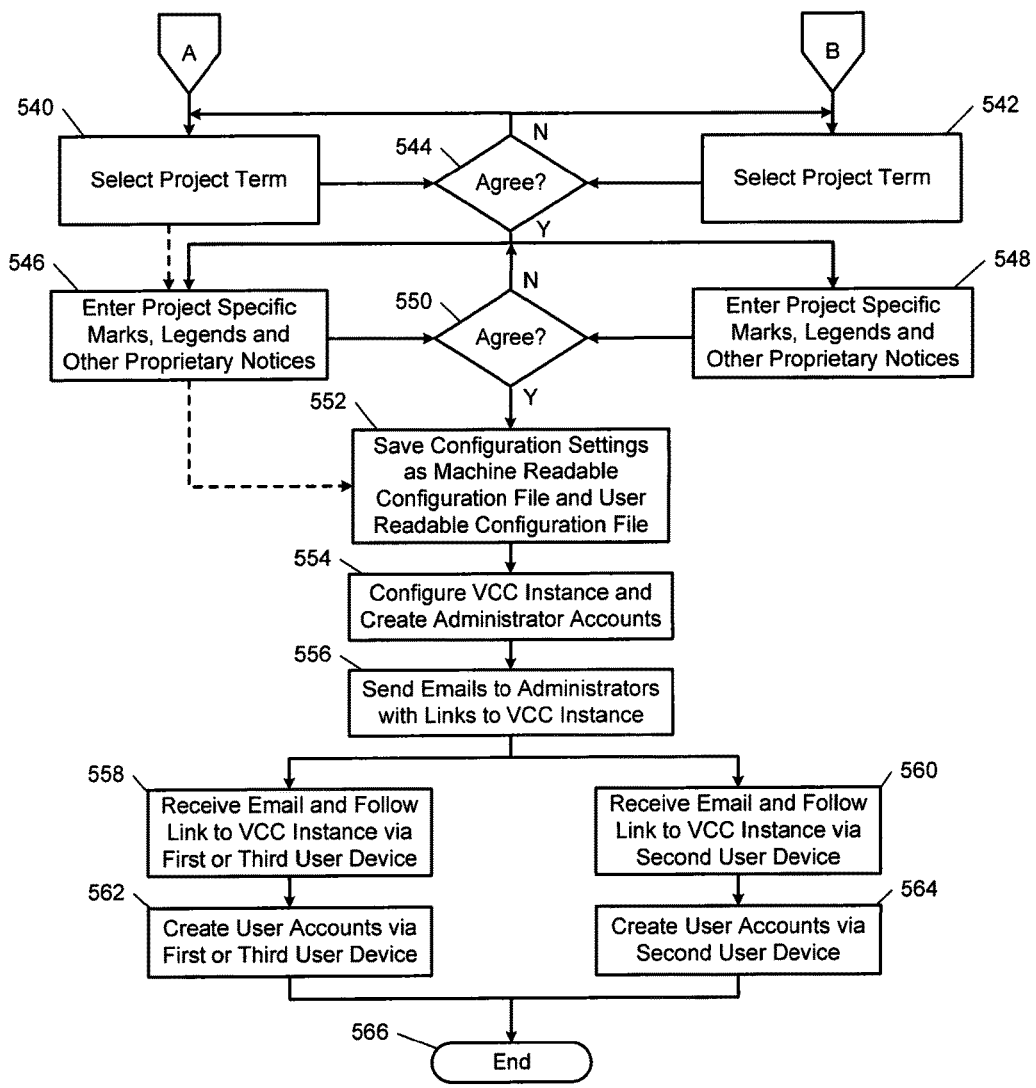

FIG. 12 shows a method of configuring a VCC instance. Although the following tasks are primarily described with respect to the implementations of FIGS. 1-3, the tasks may be easily modified to apply to other implementations of the present disclosure. The tasks may be iteratively performed. The method includes two phases. The first phase is the initiator phase and the second phase is the configuration setup phase. The first phase includes tasks 500-512. The second phase includes tasks 514-566.

The method may begin at 500. At 502, a first user device of an initiator (e.g., a corporate employee, manager and/or administrator) initiates creation of a VCC instance by establishing a link with the DMS 20 and accessing the configurator controller 159. This may be done via a web browser of the first user device and the website of the VCC system 10. The configurator controller 159 or the DMS controller 36 executing the configurator application may provide a configurator window in the web browser for entering configuration settings for the VCC instance. This may include the first user device indicating whether the VCC instance is to involve a counterpart (e.g., a second user, employee, manager, and/or administrator), which is to also have the same or similar authorization level as the initiator and/or other administrator of the VCC instance. The other administrator of the VCC instance may refer to another individual selected by the initiator that is to be an administrator for the VCC instance. The other administrator of the VCC instance may be an employee of and/or work for the same corporation and/or entity as the initiator, where the counterpart may be an employee of and/or work for a different corporation and/or entity than the initiator. The initiator or the other administrator of the VCC instance may be the below referred to first administrator.

At 504, the configurator controller 159 or the DMS controller 36 determines whether the VCC instance is to involve a counterpart based on the indication from the first user device. If there is not a counterpart, tasks 506, 508, 514, 518, 522, 528, 534, 540, 546, 552, 554, 556, 558 and 562 are performed and tasks 510, 512, 516, 520, 524, 526, 530, 532, 536, 538, 542, 544, 548, 550, 560, 564 are not performed. This is at least partially illustrated by dashed lines in FIG. 12. If there is a counterpart, then any or all of tasks 506-564 may be performed.

At 506, the initiator via the first user device may enter and/or select a name of the VCC instance, a first administrator name, a first email address of the first administrator, and/or other identification information. This information is received at the DMS 20.

At 508, the DMS 20 instructs the mail server 16 to send an email to the first user device or a third user device of the first administrator, depending on whether the first administrator is the initiator or the other administrator of the VCC instance. This email may include a link to the configurator application and provide a login ID and/or password.

At 509, the DMS 20 establishes a link with a second user device of the counterpart. This may include the counterpart accessing the VCC system 10, the DMS 20 instructing the mail server 16 to send an email to the counterpart, or other method of establishing a link, such that the counterpart is involved in creation of the VCC instance. The email may indicate any of the identification information provided at 506. In other words task 506 may be performed prior to task 509.

At 510, the counterpart via the second user device may enter and/or select a name of the VCC instance, a second administrator name, a second email address of the second administrator, and/or other identification information. This information is received at the DMS 20. The VCC instance may have the same or different names for the first and second administrators.

At 512, the DMS 20 instructs the mail server 16 to send an email to the second user device of the second administrator. This email may include a link to the configurator application and provide a login ID and/or password.

At 514, the first user device or third user device receives the email generated at 508. At 516, the second user device receives the email generated at 512.

At 518, the first user device or third user device connects to the configuration controller 159 via the link in the received email and logs in to the VCC system 10 to configure the VCC instance.

At 520, the second user device receives connects to the configuration controller 159 via the link in the received email and logs in to the VCC system 10 to configure the VCC instance.

At 522 and 524, the user devices of the administrators indicate based on inputs from the administrators whether the VCC instance is to have a dashboard. At 526, if the VCC instance is to have a dashboard and the administrators and/or signals received from the user devices are in agreement on this matter including whether dashboard data is to be included and/or the type of dashboard data to be included, then tasks 528, 530 are performed.

At 528 and 530, the user devices of the administrators indicate based on inputs from the administrators security levels of documents/files for the VCC instance. This may include one or more security levels. At 532, if the signals from the user devices are in agreement on this matter, then tasks 534, 536 are performed.

At 534 and 536, the user devices indicate based on inputs from the administrators whether documents/files are to be purged at term end of the VCC instance. Some documents/files may be purged, others may be archived. At 538, if the administrators and/or signals from the user devices are in agreement on this matter, then tasks 540, 542 are performed.

At 540, 542, the user devices indicate based on inputs from the administrators a term length of a corresponding project of the VCC instance (i.e. term length of the VCC instance). At 544, if the administrators and/or signals from the user devices are in agreement on this matter, then tasks 546, 548 are performed.

At 546, 548, the user devices indicate based on inputs from the administrators indicate project specific marks, legends, and/or other proprietary notices, which may be included in each document/file created for the VCC instance. The specific marks may include symbols, logos, trademarks, and/or other marks. At 550, if the administrators and/or signals from the user devices are in agreement on this matter, then task 552 is performed.

At 552, the configurator controller 159 saves configuration settings. The configuration settings may include any or all of the information received during the above-described tasks 502-550. This information is saved in the DMS 20 in two files, each file having a respective format, a machine readable format and a user readable format. The machine readable formatted file is readable by the DMS 20, another server of the VCC domain, and/or a user device. The user readable formatted file is readable by the administrators and/or other users authorized to access the user readable formatted file. The administrators may change the information in the user readable formatted file at a later date in a similar manner as performed above to create the VCC instance. The machine readable formatted file may be updated when the user readable formatted file is updated.

At 554, the configurator controller 159 may, based on the machine readable file, create and configure the VCC instance and create administrator accounts for the administrators if not already created during any of the above-stated tasks. This may include signaling the physical servers of the VCC system 10 that are to be involved in the VCC instance that a new VCC instance is being created and providing the servers with information pertaining to the VCC instance, such as administrator names, administrator email addresses, authorization levels of the administrators, authorization levels of the documents/files, authorization levels of dashboards and/or corresponding dashboard data, and/or other VCC instance related information. This may also include signaling the VCC domain controller 29 to create the accounts and providing the VCC domain controller 29 with authorization levels of the administrators and corresponding user devices.

At 556, the configurator controller 159 instructs the mail server 16 to send emails to the administrators with links to an application executed on the DMS 20 for accessing the VCC instance created at 554.

At 558, 560, the user devices receive the emails generated at 556. At 562, 564, the administrators via the user devices may then login and create accounts for other users, as described above. The other users may have lower authorization levels than the administrators. This may include the user device of the administrators signaling the DMS 20 to instruct the VCC domain controller 29 to create new accounts and/or obtain profiles of users, as described above. The administrators may set the authorization levels of the other users and corresponding user devices, which may be published, as also described above. The method may end at 566.

The above-described tasks of the methods of FIGS. 4-12 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The VCC systems disclosed herein provide self-contained system including document management, email services, business intelligence process automation, dashboarding, and DRM. The VCC systems are secure cloud-based systems for sharing and controlling access to documents once the documents are shared.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. These systems may be integrated with electronics for controlling their operation. The electronics may be referred to as the "controller," which may control various components or subparts of the system or systems. The controller, depending on the processing requirements and/or the type of system, may be programmed to control any of the processes disclosed herein.

Broadly speaking, the controller is defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process or to a system.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may be a remote computer and enable remote access to the system to monitor current progress via a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed. Thus as described above, the controller may be distributed, such as by comprising one or more discrete controllers that are networked together and working towards a common purpose, such as the processes and controls described herein.

What is claimed is:

1. A system comprising:
    a document server configured to (i) receive a first request signal based on an input received at a web browser of a first user device, and (ii) generate a first authentication signal based on the first request signal, wherein the first request signal requests access to view a first document at the first user device or download the first user document to the first user device, and wherein the document server provides a cloud-based service for the first user device to access the first document;
    a first domain controller configured to, based on the first authentication signal, determine a profile or authorization level of a first user of the first user device,
    wherein the document server is configured to, based on the profile or the authorization level, transmit a second authentication signal to the first user device;

a policy server comprising memory, wherein the memory is configured to store a digital rights management policy for the first user;
a mail server configured to:
send a first email notification to a second user device requesting access to the first document for the first user,
receive a first response signal from the second user device indicating whether the first user is permitted access to the first document,
based on the first response signal, send a second email notification to a third user device requesting access to the first document for the first user,
receive a second response signal indicating whether the first user is permitted access to the first document, and
sending a third email notification to the first user device indicating whether the first user is permitted access to the first document; and
a collaboration server configured to (i) based on the second authentication signal and the third email notification, receive a digital rights management signal from the first user device, and (ii) based on the digital rights management policy of the first user, permit a controller of the first user device to access the first document, wherein the collaboration server is separate from the document server, and the first domain controller; and
wherein the system is a virtual collaboration center (VCC) system configured to share the first document and other documents between network devices, wherein the network devices include the first user device; and
the document server is configured to execute a configurator application to create a plurality of VCC instances, wherein each of the plurality of VCC instances includes one or more of the network devices and is assigned ownership of one or more of the first document and the other documents, and wherein the first user and the first user device are associated with one of the plurality of VCC instances.

2. The system of claim 1, wherein:
the document server is configured to (i) receive a second request signal from the second user device requesting a permission of the first user be changed for the first document; and (ii) updated permissions of the first user; and
the collaboration server is configured to, based on the updated permissions of the first user, prevent the controller of the first user device from accessing the first document.

3. The system of claim 1, wherein:
the document server is configured to, based on the profile or authorization level, send an instruction signal to the mail server; and
the mail server is configured to, based on the instruction signal, send an email notification to the first user device indicating whether the first user is authorized to access the first document.

4. The system of claim 1, wherein:
the document server is configured to receive a username and password from the first user device;
the first domain controller is configured to (i) based on the username and password, determine whether the first user is authorized to login, and (ii) send to the document server an indication signal indicating whether the first user is authorized to login;
the document server is configured to permit login of the first user based on the indication signal; and
the collaboration server is configured to, based on whether the first user is logged in and the authorization level of the first user, permit management access, collaboration access, or dashboard access to the first user.

5. The system of claim 1, wherein:
the document server is configured to (i) receive via the web browser a second document from the first user device, (ii) encrypt the second document, and (iii) receive an authorization signal from the first user device for the second user device, wherein the authorization signal indicates a second authorization level of a second user of the second user device; and
the document server or the collaboration server is configured to, based on the second authorization level, permit access to the second document by the second user.

6. The system of claim 1, wherein:
the first request signal requests decryption, downloading or editing access to the first document; and
the mail server is configured to send an email notification to the first user device indicating whether the first user is authorized to decrypt, download or edit the first document.

7. The system of claim 1, wherein:
the digital rights management policy comprises a plurality of permissions;
the document server is configured to (i) receive a second request signal from the second user device requesting access to the first document be permitted for the first user, (ii) update the authorization level based on the second request signal, and (iii) update one of the plurality of permissions for the first document in the policy server; and
the collaboration server is configured to permit access to the first document based on the updated one of the plurality of permissions.

8. The system of claim 1, wherein the document server is configured to either (i) apply a watermark to the first document prior to storing and viewing the first document on the first user device, or (ii) cause the controller of the first user device to apply a watermark to the first document prior to storing and viewing the first document on the first user device, such that the first document is stored with the watermark in the first user device.

9. The system of claim 1, further comprising a database server configured to store data for a dashboard, wherein the document server is configured to:
receive a link or second request signal from the first user device, wherein the link is to the dashboard or the second request signal requests access to the dashboard;
access the data in the database server; and
provide the data to the first user device.

10. The system of claim 9, wherein the document server is configured to either (i) apply a watermark over content being displayed on the web browser, or (ii) cause the controller of the first device to apply a watermark over the dashboard when viewed via the web browser, wherein the content includes for the dashboard.

11. A method comprising:
receiving a first request signal at a document server based on an input received at a web browser of a first user device;
generating a first authentication signal based on the first request signal, wherein the first request signal requests access to view a first document at the first user device or download the first document to the first user device, and wherein the document server provides a cloud-based service for the first user device to access the first document;

based on the first authentication signal, determining a profile or authorization level of a first user of the first user device, wherein the document server is configured to, based on the profile or the authorization level, transmit a second authentication signal to the first user device;

storing a digital rights management policy for the first user in a memory of a policy server;

sending from a mail server a first email notification to a second user device requesting access to the first document for the first user;

receiving at the mail server a first response signal from the second user device indicating whether the first user is permitted access to the first document;

based on the first response signal, send a second email notification from the mail server to a third user device requesting access to the first document for the first user;

receive at the mail server a second response signal indicating whether the first user is permitted access to the first document;

sending a third email notification from the mail server to the first user device indicating whether the first user is permitted access to the first document;

based on the second authentication signal and the third email notification, receiving at a collaboration server a digital rights management signal from the first user device;

based on the digital rights management policy of the first user, permitting a controller of the first user device to access the first document, wherein the collaboration server is separate from the document server;

wherein the method is implemented via a virtual collaboration center (VCC) system that is configured to share the first document and other documents between network devices, and wherein the network devices include the first user device; and executing a configurator application at the document server to create a plurality of VCC instances, wherein each of the plurality of VCC instances includes one or more of the network devices and is assigned ownership of one or more of the first document and the other documents, and wherein the first user and the first user device are associated with one of the plurality of VCC instances.

12. The method of claim 11, further comprising:
receiving at the document server a second request signal from the second user device requesting a permission of the first user be changed for the first document;
updating permissions of the first user; and
based on the updated permissions of the first user, preventing via the collaboration server the controller of the first user device from accessing the first document.

13. The method of claim 11, further comprising:
based on the profile or authorization level, sending via the document server an instruction signal to the mail server; and
based on the instruction signal, sending from the mail server an email notification to the user device indicating whether the first user is authorized to access the first document.

14. The method of claim 11, further comprising:
receiving at the document server a username and password from the first user device;
based on the username and password, determining whether the first user is authorized to login;
sending to the document server an indication signal indicating whether the first user is authorized to login;
permitting login of the first user based on the indication signal; and
based on whether the first user is logged in and the authorization level of the first user, permit management access, collaboration access, or dashboard access to the first user.

15. The method of claim 11, further comprising:
receiving via the web browser a second document from the first user device;
encrypting the second document;
receiving an authorization signal from the first user device for the second user device, wherein the authorization signal indicates a second authorization level of a second user of the second user device; and
based on the second authorization level, permitting access to the second document by the second user.

16. The method of claim 11, further comprising sending an email notification to the first user device from the mail server indicating whether the first user is authorized to decrypt, download or edit the first document, wherein the first request signal requests decryption, downloading or editing access to the first document.

17. The method of claim 11, further comprising:
receiving at the document server a second request signal from the second user device requesting access to the first document be permitted for the first user;
updating the authorization level based on the second request signal, wherein the digital rights management policy comprises a plurality of permissions;
updating one of the plurality of permissions for the first document in the policy server; and
permitting via the collaboration server access to the first document based on the updated one of the plurality of permissions.

18. The method of claim 11, further comprising, via the document server, either (i) applying a watermark to the first document prior to viewing on the first user device, or (ii) causing the controller of the first user device to apply a watermark to the first document prior to viewing on the first user device.

19. The method of claim 11, further comprising:
storing data for a dashboard at a database server;
receiving a link or second request signal from the first user device at the document server, wherein the link is to the dashboard or the second request signal requests access to the dashboard;
accessing the data in the database server; and
providing the data to the first user device.

20. The method of claim 19, further comprising, via the document server, either (i) applying a watermark over content being displayed on the web browser, or (ii) causing the controller of the first device to apply a watermark over the dashboard when viewed via the web browser, wherein the content includes for the dashboard.

21. The system of claim 1, wherein:
the document server is configured to transmit the first authentication signal to the first domain controller; and
the domain controller is separate from the document server and is configured to transmit the profile or authorization level of the first user to the document server.

22. The system of claim 1, wherein:
the policy server is configured to transmit the digital rights management signal to the collaboration server; and
the collaboration server is configured to (i) based on the digital rights management signal and the digital rights management policy, verify digital rights permissions of the first user device, and (ii) based on the verification of the digital rights permissions, permit the controller of the first user device to access the first document.

23. The system of claim 1, wherein:
the first document is stored in a memory of the first user device; and
the collaboration server is configured to permit the controller of the first user device to at least one of access or decrypt the first document stored in the memory of the first user device.

24. The system of claim 1, wherein:
the first domain controller receives the profile from a second domain controller;
the first domain controller is configured to, based on the first authentication signal and the profile as provided by the second domain controller, verify the authorization level of the first user; and
the second domain controller is separate from the document server and the first domain controller.

25. The system of claim 1, wherein the document server is configured to, during setup of the first user device, download a digital rights management application to the first user device to establish the controller of the first user device as a digital rights management controller able to perform a digital rights management verification to verify the authorization level of the first user.

26. A system comprising:
a document server configured to (i) receive a first request signal based on an input received at a web browser of a first user device, and (ii) generate a first authentication signal based on the first request signal, wherein the first request signal requests access to a first document, and wherein the document server provides a cloud-based service for the first user device to access the first document;
a first domain controller configured to, based on the first authentication signal, determine a profile or authorization level of a first user of the first user device,
wherein the document server is configured to, based on the profile or the authorization level, transmit a second authentication signal to the first user device;
a policy server comprising memory, wherein the memory is configured to store a digital rights management policy for the first user; and
a collaboration server configured to (i) based on the second authentication signal, receive a digital rights management signal from the first user device, and (ii) based on the digital rights management policy of the first user, permit a controller of the first user device to access the first document, wherein the collaboration server is separate from the document server and the first domain controller,
wherein
the system is a virtual collaboration center (VCC) system configured to share the first document and other documents between network devices,
the network devices include the first user device,
the document server is configured to execute a configurator application to create a plurality of VCC instances,
each of the plurality of VCC instances includes one or more of the network devices and is assigned ownership of one or more of the first document and the other documents,
the first user and the first user device are associated with one of the plurality of VCC instances, and
when the first request signal requests access to delete the first document, the document server deletes the first document, generates a certificate of deletion and sends instructions for an electronic mail (email) notification to be sent to the first user device comprising a link to the certificate of deletion.

* * * * *